(12) United States Patent
Park et al.

(10) Patent No.: US 12,500,967 B2
(45) Date of Patent: Dec. 16, 2025

(54) ELECTRONIC DEVICE INCLUDING DISPLAY SUPPORT STRUCTURE

(71) Applicant: Samsung Electronics Co., Ltd., Suwon-si (KR)

(72) Inventors: Daehyeong Park, Suwon-si (KR); Jaehee Kim, Suwon-si (KR); Jongyoon Kim, Suwon-si (KR); Minsung Lee, Suwon-si (KR); Uyhyeon Jeong, Suwon-si (KR); Iksu Jung, Suwon-si (KR); Yonghwa Han, Suwon-si (KR); Kyunghoon Hyun, Suwon-si (KR); Seunghyun Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 516 days.

(21) Appl. No.: 17/817,847

(22) Filed: Aug. 5, 2022

(65) Prior Publication Data
US 2023/0044990 A1    Feb. 9, 2023

Related U.S. Application Data

(63) Continuation of application No. PCT/KR2022/010120, filed on Jul. 12, 2022.

(30) Foreign Application Priority Data

Aug. 6, 2021 (KR) .................. 10-2021-0103956

(51) Int. Cl.
*H04M 1/02* (2006.01)
*F16C 11/04* (2006.01)
(Continued)

(52) U.S. Cl.
CPC .......... *H04M 1/022* (2013.01); *F16C 11/045* (2013.01); *F16C 11/12* (2013.01); *G06F 1/1616* (2013.01);
(Continued)

(58) Field of Classification Search
CPC .... H04M 1/021; H04M 1/022; H04M 1/0216; H04M 1/0268; H04M 2201/38;
(Continued)

(56) References Cited

U.S. PATENT DOCUMENTS

| 10,824,197 B1 | 11/2020 | Hsu et al. |
| 2018/0059740 A1 | 3/2018 | Kato |

(Continued)

FOREIGN PATENT DOCUMENTS

| CN | 112153178 A | 12/2020 |
| CN | 112333308 A | 2/2021 |

(Continued)

OTHER PUBLICATIONS

International Search Report and Written Opinion of the International Searching Authority dated Oct. 11, 2022, in connection with International Application No. PCT/KR2022/010120, 9 pages.

(Continued)

*Primary Examiner* — Quoc Thai N Vu

(57) ABSTRACT

According to various embodiments, an electronic device includes a first housing; a second housing; at least one hinge device configured to foldably couple the first housing and the second housing with respect to a folding axis, wherein the at least one hinge device includes a rotation bracket link; a first rotation bracket rotatably coupled to the rotation bracket link and connected to the first housing; a second rotation bracket rotatably coupled to the rotation bracket link and connected to the second housing; at least one hinge device including a first arm coupled to the first rotation bracket and a second arm coupled to the second rotation bracket; a flexible display disposed to receive support from the first housing, the second housing, and the hinge device; and a first plate and second plate disposed under the flexible display, wherein the first arm and the second arm have the (Continued)

second plate and a support area for supporting the second plate when the electronic device is in an unfolded state.

20 Claims, 19 Drawing Sheets

(51) Int. Cl.
   *F16C 11/12*   (2006.01)
   *G06F 1/16*    (2006.01)
(52) U.S. Cl.
   CPC .......... *G06F 1/1652* (2013.01); *G06F 1/1681* (2013.01); *H04M 1/0268* (2013.01); *H04M 2201/38* (2013.01)
(58) Field of Classification Search
   CPC ...... H05K 5/0226; F16C 11/045; F16C 11/12; F16C 2370/00; G06F 1/1613; G06F 1/1615; G06F 1/1616; G06F 1/1622; G06F 1/1652; G06F 1/1681; G06F 1/16; G06F 1/1641; G06F 3/044; G06F 1/1628; G06F 1/1643; G06F 3/0442; G09F 9/301
   See application file for complete search history.

(56) References Cited

U.S. PATENT DOCUMENTS

| | | |
|---|---|---|
| 2020/0348732 A1 | 11/2020 | Kang et al. |
| 2021/0116975 A1 | 4/2021 | Moon |
| 2021/0165446 A1* | 6/2021 | Inada ................... G06F 1/1607 |
| 2021/0165466 A1 | 6/2021 | Kang et al. |
| 2021/0181808 A1 | 6/2021 | Liao et al. |
| 2022/0116489 A1 | 4/2022 | Nagai et al. |
| 2022/0365568 A1* | 11/2022 | Torres ....................... E05D 3/16 |
| 2024/0007553 A1* | 1/2024 | Cheng ................... G06F 1/1652 |

FOREIGN PATENT DOCUMENTS

| | | |
|---|---|---|
| CN | 113067924 A | 7/2021 |
| CN | 113067926 A | 7/2021 |
| EP | 3812877 A1 | 4/2021 |
| KR | 10-2018-0025818 A | 3/2018 |
| KR | 10-2021-0009574 A | 1/2021 |
| KR | 10-2021-0068880 A | 6/2021 |

OTHER PUBLICATIONS

Decision of Patent dated Aug. 21, 2023, in connection with Korean Application No. 10-2021-0103956, 11 pages.
Supplementary European Search Report dated Sep. 30, 2024, in connection with European Application No. 22853289.1, 37 pages.

* cited by examiner

ELECTRONIC DEVICE INCLUDING DISPLAY SUPPORT STRUCTURE

CROSS-REFERENCE TO RELATED APPLICATIONS

This application is a continuation of International Application No. PCT/KR2022/010120, filed on Jul. 12, 2022, which claims priority to Korean Patent Application No. 10-2021-0103956, filed on Aug. 6, 2021 in the Korean Intellectual Property Office, the disclosures of which are herein incorporated by reference.

BACKGROUND

1. Field

Various embodiments of the disclosure relate to an electronic device including a display support structure.

2. Description of Related Art

As a functional gap between manufacturers is remarkably reduced, electronic devices are gradually becoming thinner in order to satisfy consumer purchasing desires, and are being improved to increase rigidity thereof, to strengthen design aspects thereof, and to differentiate functional elements thereof. These electronic devices are gradually transforming into various shapes, out of a uniform rectangular shape. For example, the electronic device may have transformable structures that are convenient to carry and that can use a large screen display when used. As a part of such electronic devices, foldable electronic devices are continuously being released, and an improved support structure for a foldable flexible display may be required.

SUMMARY

An electronic device may include a foldable electronic device including a first housing and a second housing foldably connected to the first housing through a hinge device. The first housing and the second housing may be structurally coupled to a hinge device and be operated while being supported by the hinge device (e.g., hinge or hinge module). during a folded state and/or an unfolded state. Such a foldable electronic device may be operated in an in-folding manner and/or in an out-folding manner by rotating the first housing in a range from 0 to 360 degrees with respect to the second housing through the hinge device. The foldable electronic device may include a flexible display disposed to cross the first housing and the second housing in an opened state at 180 degrees.

The electronic device may include a pair of plates for providing a flat surface for the flexible display by covering the hinge device under the flexible display and being connected to the first housing. According to certain embodiments, the pair of plates may include a first plate connected to the first housing and disposed to cover at least a portion of the hinge device and a second plate connected to the second housing and disposed to cover at least a portion of the hinge device. When the electronic device is operated, in order to provide flexibility of the flexible display, the first plate and the second plate may be disposed to be spaced apart from each other.

The electronic device may include a digitizer disposed between the flexible display and the pair of plates. Such a digitizer may detect an input of an electronic pen close to or in contact with the flexible display.

When the electronic device is in an unfolded state, at least a portion of the first plate and the second plate may be supported by a hinge device including a plurality of hinge structures (e.g., cams, springs, or stoppers).

However, in an area corresponding to the hinge device, support parts of the first plate and the second plate are insufficient; thus, the flexible display is unsafely supported, thereby providing discomfort to a user and lowering operability. Such operability degradation may reduce a detection performance of the digitizer.

Various embodiments of the disclosure may provide an electronic device including a display support structure.

According to various embodiments, by increasing a support area of a hinge device disposed under the first plate and the second plate, an electronic device including a display support structure capable of inducing stable support of a flexible display may be provided.

According to various embodiments, by increasing a support area of a hinge device disposed under the first plate and the second plate, an electronic device including a display support structure that can help to improve a performance of a flexible display and/or a digitizer may be provided.

However, the problems to be solved in the disclosure are not limited to the above-mentioned problems, and may be variously expanded without departing from the spirit and scope of the disclosure.

Technical Solution

According to various embodiments, an electronic device includes a first housing; a second housing; at least one hinge device configured to foldably couple the first housing and the second housing with respect to a folding axis, wherein the at least one hinge device includes a rotation bracket link; a first rotation bracket rotatably coupled to the rotation bracket link with respect to the folding axis and connected to the first housing; a second rotation bracket rotatably coupled to the rotation bracket link with respect to the folding axis and connected to the second housing; at least one hinge device including a first arm coupled to the first rotation bracket and rotatably disposed based on a first rotation axis of a first shaft disposed parallel to the folding axis at one side of the folding axis; and a second arm coupled to the second rotation bracket and rotatably disposed based on a second rotation shaft of a second shaft disposed parallel to the folding axis at the other side of the folding axis; a flexible display disposed to receive support from the first housing, the second housing, and the hinge device; a first plate disposed to at least partially overlap the first arm and coupled to the first housing under the flexible display; and a second plate disposed to at least partially overlap the second arm and coupled to the second housing under the flexible display, wherein the first arm and the second arm each have a support area for respectively supporting the first plate and the second plate when the electronic device is in an unfolded state.

According to various embodiments, a hinge device includes a rotation bracket link; a first rotation bracket rotatably coupled to the rotation bracket link based on a folding axis; a second rotation bracket rotatably coupled to the rotation bracket link based on the folding axis at a position opposite to that of the first rotation bracket; a first arm coupled to the first rotation bracket and rotatably disposed based on a first rotation axis of a first shaft disposed parallel to the folding axis at one side of the folding axis, and including at least one first cam structure; a second arm coupled to the second rotation bracket and rotatably disposed based on a second rotation shaft of a second shaft disposed parallel to the folding axis at the other side of the folding axis, and including at least one second cam structure; and at least one hinge cam disposed to be cam-coupled to the at least one first cam structure and the at least one second cam structure in a manner in which the first shaft and the second shaft can be inserted through the at least one hinge cam, wherein the first arm, the second arm, the at least one first cam structure, the at least one second cam structure, and the at least one hinge cam include a flat support area for supporting at least one plate disposed thereon.

An electronic device according to embodiments of the disclosure increases a support area of at least some components of a hinge device disposed under a first plate and a second plate in an unfolded state, thereby helping to improve a performance of a flexible display and/or a digitizer.

Further, various effects directly or indirectly identified through this document can be provided.

Before undertaking the detailed description below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

In connection with the description of the drawings, the same or similar reference numerals may be used for the same or similar components.

DETAILED DESCRIPTION

FIGS. 1A through 11B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1A:
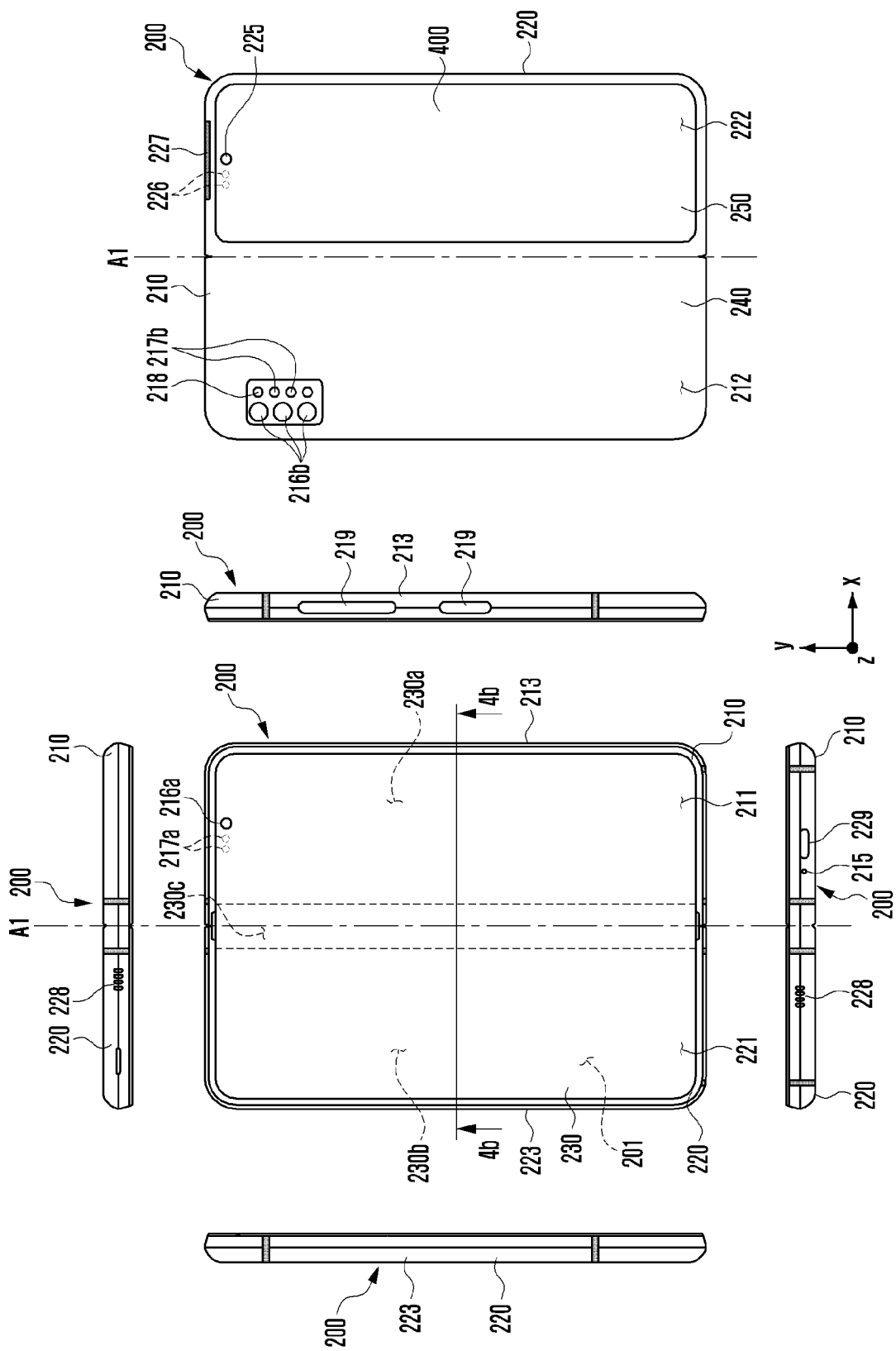
FIG. 1A is a diagram illustrating an unfolded state of an electronic device according to various embodiments of the disclosure.
Figure 1B:
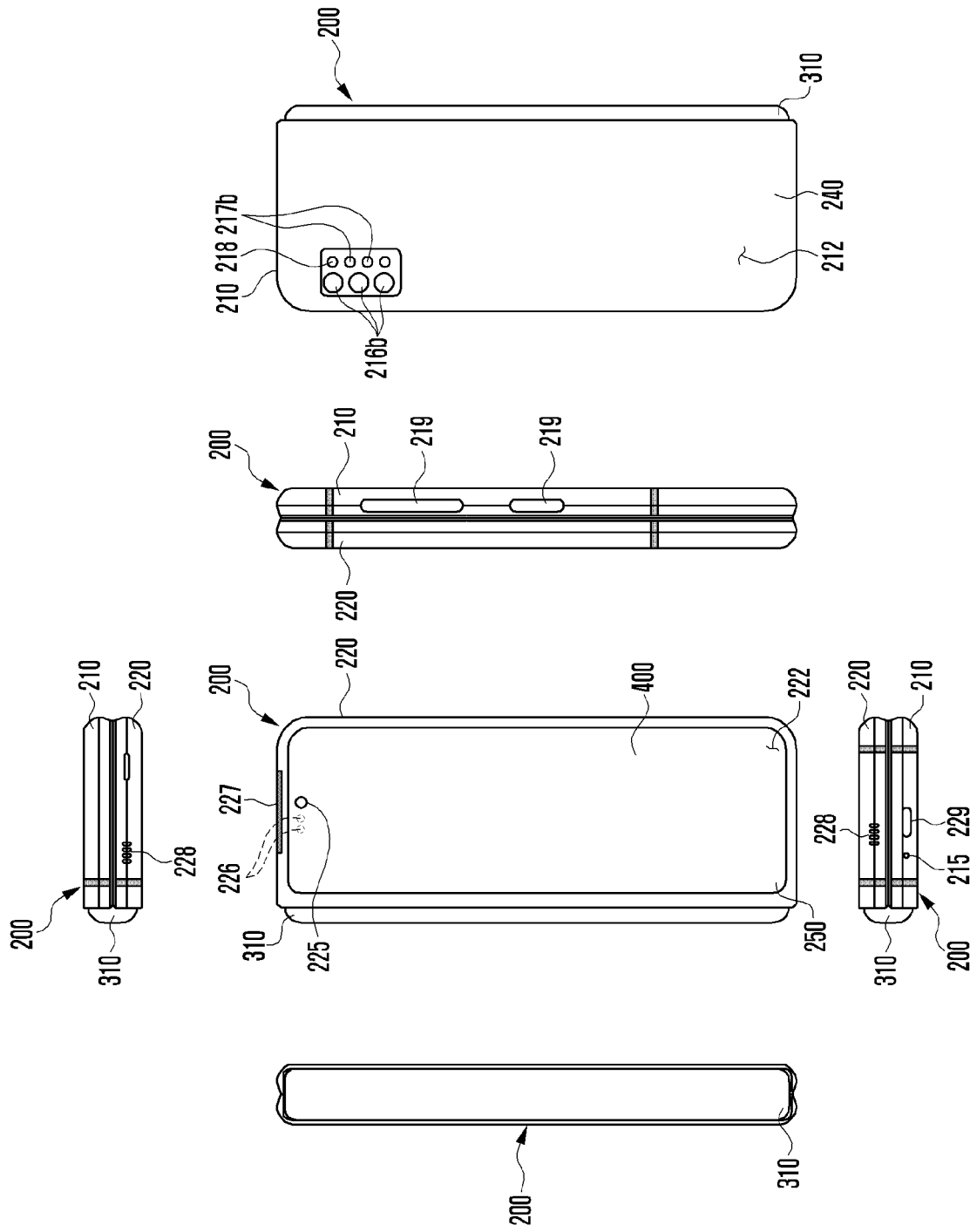
FIG. 1B is a diagram illustrating a folded state of the electronic device of FIG. 1 according to various embodiments of the disclosure.

FIG. 1A is a diagram illustrating an unfolded state of an electronic device 200 according to various embodiments of the disclosure. FIG. 1B is a diagram illustrating a folded state of the electronic device 200 of FIG. 1A according to various embodiments of the disclosure.

Referring to FIGS. 1A and 1B, the electronic device 200 may include a pair of housings 210 and 220 (e.g., foldable housing) rotatably coupled based on a folding axis A through a hinge device (e.g., a hinge device 320, 320-1 of FIG. 3) to be foldable with respect to each other, a first display 230 (e.g., flexible display, foldable display, or main display) disposed through the pair of housings 210 and 220, and/or a second display 400 (e.g., sub-display) disposed through the second housing 220. According to certain embodiments, at least a portion (e.g., hinge devices 320 and 320-1 of FIG. 3) of the hinge device (e.g., the hinge device 320, 320-1 of FIG. 3) may be disposed to not be visible from the outside through the first housing 210 and the second housing 220 and disposed to not be visible from the outside through a hinge housing 310 covering a foldable portion in an unfolded state. In this document, a surface in which the first display 230 is disposed may be defined as a front surface of the electronic device 200, and an opposite surface of the front surface may be defined as a rear surface of the electronic device 200. Further, a surface enclosing a space between the front surface and the rear surface may be defined as a side surface of the electronic device 200.

Figure 3:
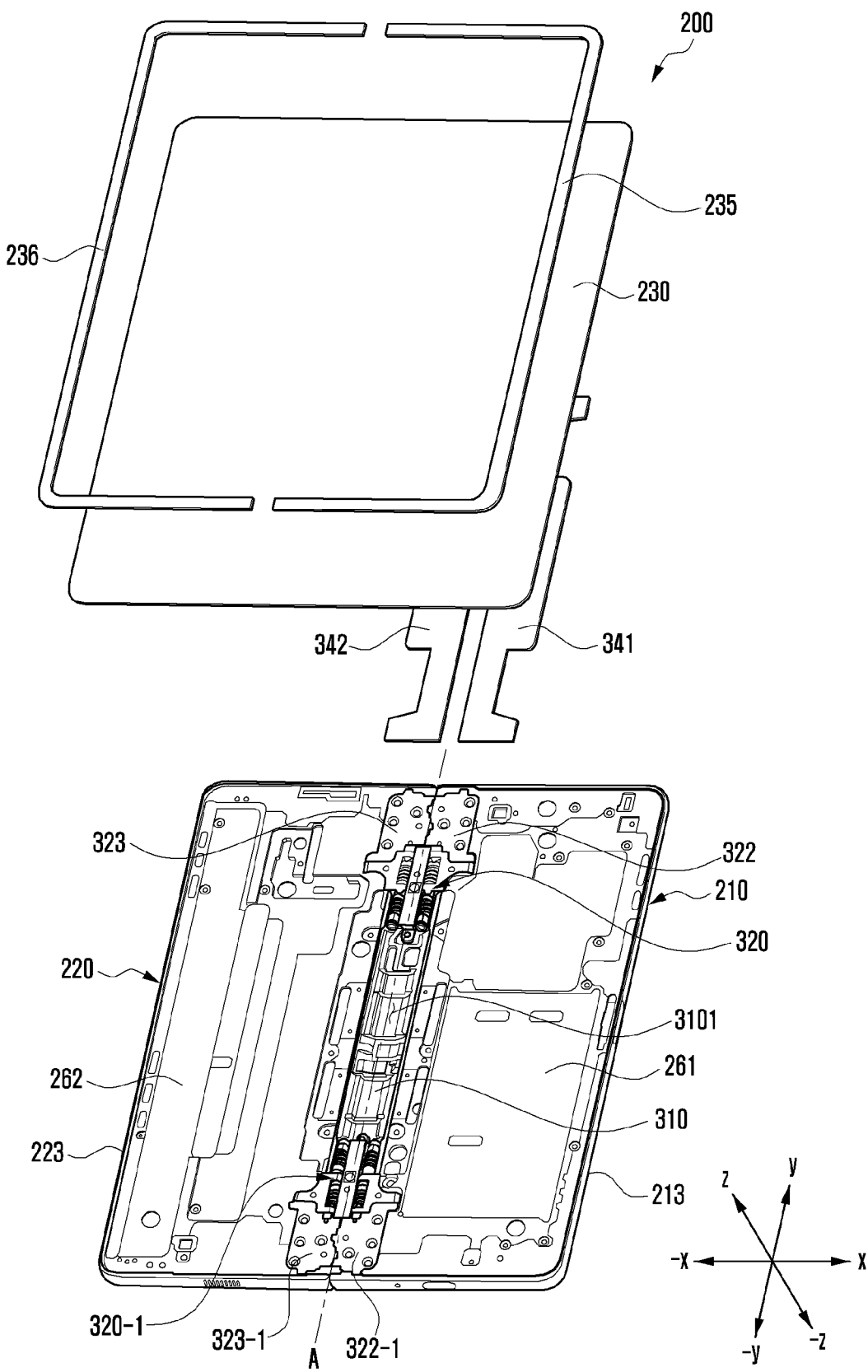
FIG. 3 is an exploded perspective view illustrating an electronic device including a hinge device of the electronic device according to various embodiments of the disclosure.

According to various embodiments, the pair of housings 210 and 220 may include a first housing 210 and second housing 220 disposed to be foldable with respect to each other through the hinge device (e.g., the hinge device 320, 320-1 of FIG. 3). According to certain embodiments, the pair of housings 210 and 220 are not limited to the shape and coupling illustrated in FIGS. 1A and 1B, and may be implemented by a combination and/or coupling of other shapes or parts. According to certain embodiments, the first housing 210 and the second housing 220 may be disposed at both sides based on the folding axis A, and have an overall symmetrical shape with respect to the folding axis A. According to some embodiments, the first housing 210 and the second housing 220 may be folded asymmetrically based on the folding axis A. According to certain embodiments, the first housing 210 and the second housing 220 may have different angles or distances from each other according to whether the electronic device 200 is in an unfolded state, a folded state, or an intermediate state.

According to various embodiments, when the electronic device 200 is in an unfolded state, the first housing 210 may include a first surface 211 connected to the hinge device (e.g., the hinge device 320, 320-1 of FIG. 3) and disposed to face the front of the electronic device 200, a second surface 212 facing in a direction opposite to that of the first surface 211, and/or a first side member 213 enclosing at least a portion of a first space between the first surface 211 and the second surface 212. According to certain embodiments, when the electronic device 200 is in an unfolded state, the second housing 220 may include a third surface 221 connected to the hinge device (e.g., the hinge device 320, 320-1 of FIG. 3), and disposed to face the front of the electronic device 200, a fourth surface 222 facing in a direction opposite that of the third surface 221, and/or a second side member 223 enclosing at least a portion of a second space between the third surface 221 and the fourth surface 222. According to certain embodiments, the first surface 211 may face in substantially the same direction as that of the third surface 221 when the electronic device is in an unfolded state and at least partially face the third surface 221 when the electronic device is in a folded state. According to certain embodiments, the electronic device 200 may include a recess 201 formed to receive the first display 230 through structural coupling of the first housing 210 and the second housing 220. According to certain embodiments, the recess 201 may have substantially the same size as that of the first display 230.

According to various embodiments, the hinge housing 310 (e.g., hinge cover) may be disposed between the first housing 210 and the second housing 220 and be disposed to cover a hinge device (e.g.: the hinge device s 320 and 320-1 of FIG. 3) disposed in the hinge housing 310. According to certain embodiments, the hinge housing 310 may be covered by a part of the first housing 210 and the second housing 220 or may be exposed to the outside according to an unfolded state, a folded state, or an intermediate state of the electronic device 200. For example, when the electronic device 200 is in an unfolded state, at least a portion of the hinge housing 310 may be covered by the first housing 210 and the second housing 220 to not be substantially exposed. According to certain embodiments, when the electronic device 200 is in a folded state, at least a portion of the hinge housing 310 may be exposed to the outside between the first housing 210 and the second housing 220. According to certain embodiments, when the first housing 210 and the second housing 220 are in an intermediate state folded with a certain angle, the hinge housing 310 may be at least partially exposed to the outside of the electronic device 200 between the first housing 210 and the second housing 220. For example, an area in which the hinge housing 310 is exposed to the outside may be smaller than that in a fully folded state. According to certain embodiments, the hinge housing 310 may include a curved surface.

According to various embodiments, when the electronic device 200 is in an unfolded state (e.g., the state of FIG. 1A), the first housing 210 and the second housing 220 form an angle of approximately 180 degrees, and a first area 230a, a folding area 230c, and a second area 230b of the first display 230 may form the same flat surface and be disposed to face in substantially the same direction. In another embodiment, when the electronic device 200 is in an unfolded state, the first housing 210 may rotate at an angle of approximately 360 degrees with respect to the second housing 220 so that the second surface 212 and the fourth surface 222 may be reversely folded to face each other (out-folding method).

According to various embodiments, when the electronic device 200 is in the folded state (e.g., the state of FIG. 1B), the first surface 211 of the first housing 210 and the third surface 221 of the second housing 220 may be disposed to face each other. In this case, the first area 230a and the second area 230b of the first display 230 may form a narrow angle (e.g., a range of 0 degree to approximately 10 degree) each other through the folding area 230c and be disposed to face each other. According to certain embodiments, at least a portion of the folding area 230c may be transformed into a curved shape having a predetermined curvature. According to certain embodiments, when the electronic device 200 is in an intermediate state, the first housing 210 and the second housing 220 may be disposed at a certain angle to each other. In this case, the first area 230a and the second area 230b of the first display 230 may form an angle larger than the folded state and smaller than the unfolded state, and a curvature of the folding area 230c may be smaller than that of the folded state and be larger than that of the unfolded state. In some embodiments, the first housing 210 and the second housing 220 may form an angle that may stop at a specified folding angle between the folded state and the unfolded state through the hinge device (e.g., the hinge device 320, 320-1 of FIG. 3) (free stop function). In some embodiments, the first housing 210 and the second housing 220 may be operated while being pressurized in an unfolding direction or a folding direction based on a specified inflection angle through the hinge device (e.g., the hinge device 320, 320-1 of FIG. 3).

According to various embodiments, the electronic device 200 may include at least one of at least one display 230 and 400, an input device 215, sound output devices 227 and 228, sensor modules 217a, 217b, and 226, camera modules 216a, 216b, and 225, a key input device 219, an indicator, or a connector port 229 disposed in the first housing 210 and/or the second housing 220. In some embodiments, the electronic device 200 may omit at least one of the components or may additionally include at least one other component.

According to various embodiments, the at least one display 230 and 400 may include a first display 230 (e.g., flexible display) disposed to receive support from the third surface 221 of the second housing 220 through the hinge device (e.g., the hinge device 320, 320-1 of FIG. 3) from the first surface 211 of the first housing 210, and a second display 400 disposed to be visible at least partially from the outside through the fourth surface 222 in an inner space of the second housing 220. As another example, the second display 400 may be disposed to be visible from the outside through the second surface 212 in an inner space of the first housing 210. According to certain embodiments, the first display 230 may be mainly used in an unfolded state of the electronic device 200, and the second display 400 may be mainly used in a folded state of the electronic device 200. According to certain embodiments, when the electronic device 200 is in an intermediate state, the electronic device 200 may control the first display 230 and/or the second display 400 to be usable based on a folding angle of the first housing 210 and the second housing 220.

According to various embodiments, the first display 230 may be disposed in a receiving space formed by a pair of housings 210 and 220. For example, the first display 230 may be disposed in the recess 201 formed by the pair of housings 210 and 220, and when the electronic device 200 is in an unfolded state, the first display 230 may be disposed to occupy substantially most of the front surface of the electronic device 200. According to certain embodiments, the first display 230 may include a flexible display whose at least a partial area may be transformed into a flat surface or a curved surface. According to certain embodiments, the first display 230 may include a first area 230a facing the first housing 210, a second area 230b facing the second housing 220, and a folding area 230c connecting the first area 230a and the second area 230b and facing the hinge device (e.g., the hinge device 320, 320-1 of FIG. 3). According to certain embodiments, area division of the first display 230 is an exemplary physical division by a pair of housings 210 and 220 and the hinge device (e.g., the hinge device 320, 320-1 of FIG. 3), and the first display 230 may be displayed as a substantially seamless single full screen through the pair of housings 210 and 220 and the hinge device (e.g., the hinge device 320, 320-1 of FIG. 3). According to certain embodiments, the first area 230a and the second area 230b may have an overall symmetrical shape or a partially asymmetrical shape based on the folding area 230c.

According to various embodiments, the electronic device 200 may include a first rear cover 240 disposed at the second surface 212 of the first housing 210 and a second rear cover 250 disposed at the fourth surface 222 of the second housing 220. In some embodiments, at least a portion of the first rear cover 240 may be integrally formed with the first side member 213. In some embodiments, at least a portion of the second rear cover 250 may be integrally formed with the second side member 223. According to certain embodiments, at least one cover of the first rear cover 240 and the second rear cover 250 may be formed with a substantially transparent plate (e.g., a polymer plate or a glass plate including various coating layers) or an opaque plate. According to certain embodiments, the first rear cover 240 may be formed by an opaque plate such as, for example, coated or tinted glass, ceramic, polymer, metal (e.g., aluminum, stainless steel (STS), or magnesium), or a combination of at least two of the above materials. According to certain embodiments, the second rear cover 250 may be formed through a substantially transparent plate such as glass or polymer, for example. Accordingly, the second display 400 may be disposed to be visible from the outside through the second rear cover 250 in an inner space of the second housing 220.

According to various embodiments, the input device 215 may include a microphone. In some embodiments, the input device 215 may include a plurality of microphones disposed to detect a direction of a sound. According to certain embodiments, the sound output devices 227 and 228 may include speakers. According to certain embodiments, the sound output devices 227 and 228 may include a call receiver 227 disposed through the fourth surface 222 of the second housing 220 and an external speaker 228 disposed through at least a portion of the second side member 223 of the second housing 220. In some embodiments, the input device 215, the sound output devices 227 and 228, and the connector 229 may be disposed in spaces of the first housing 210 and/or the second housing 220 and be exposed to an external environment through at least one hole formed in the first housing 210 and/or the second housing 220. In some embodiments, holes formed in the first housing 210 and/or the second housing 220 may be commonly used for the input device 215 and the sound output devices 227 and 228. In some embodiments, the sound output devices 227 and 228 may include a speaker (e.g., piezo speaker) operating while excluding a hole formed in the first housing 210 and/or the second housing 220.

According to various embodiments, the camera modules 216a, 216b, and 225 may include a first camera module 216a disposed at the first surface 211 of the first housing 210, a second camera module 216b disposed at the second surface 212 of the first housing 210, and/or a third camera module 225 disposed at the fourth surface 222 of the second housing 220. According to certain embodiments, the electronic device 200 may include a flash 218 disposed near the second camera module 216b. According to certain embodiments, the flash 218 may include, for example, a light emitting diode or a xenon lamp. According to certain embodiments, the camera modules 216a, 216b, and 225 may include one or a plurality of lenses, an image sensor, and/or an image signal processor. In some embodiments, at least one camera module of the camera modules 216a, 216b, and 225 may include two or more lenses (e.g., wide-angle and telephoto lenses) and image sensors and be disposed together at any one surface of the first housing 210 and/or the second housing 220.

According to various embodiments, the sensor modules 217a, 217b, and 226 may generate an electrical signal or a data value corresponding to an internal operating state of the electronic device 200 or an external environmental state. According to certain embodiments, the sensor modules 217a, 217b, and 226 may include a first sensor module 217a disposed at the first surface 211 of the first housing 210, a second sensor module 217b disposed at the second surface 212 of the first housing 210, and/or a third sensor module 226 disposed at the fourth surface 222 of the second housing 220. In some embodiments, the sensor modules 217a, 217b, and 226 may include at least one of a gesture sensor, a grip sensor, a color sensor, an infrared (IR) sensor, an illuminance sensor, an ultrasonic sensor, an iris recognition sensor, or a distance detection sensor (e.g., time of flight (TOF) sensor or light detection and ranging (LiDAR)).

According to various embodiments, the electronic device 200 may further include a sensor module, for example, at least one of an atmospheric pressure sensor, a magnetic sensor, a biometric sensor, a temperature sensor, a humidity sensor, or a fingerprint recognition sensor. In some embodiments, the fingerprint recognition sensor may be disposed through at least one of the first side member 213 of the first housing 210 and/or the second side member 223 of the second housing 220.

According to various embodiments, the key input device 219 may be disposed to be exposed to the outside through the first side member 213 of the first housing 210. In some embodiments, the key input device 219 may be disposed to be exposed to the outside through the second side member 223 of the second housing 220. In some embodiments, the electronic device 200 may not include some or all of the key input devices 219, and the non-included key input devices 219 may be implemented into other forms such as soft keys on at least one display 230 and 400. As another embodiment, the key input device 219 may be implemented using a pressure sensor included in at least one display 230 and 400.

According to various embodiments, the connector port 229 may include a connector (e.g., USB connector or interface connector port module (IF module)) for transmitting and receiving power and/or data to and from an external electronic device. In some embodiments, the connector port 229 may further include a separate connector port (e.g., ear jack hole) for performing together a function for transmitting and receiving an audio signal to and from an external electronic device or for performing a function of transmitting and receiving an audio signal.

According to various embodiments, at least one camera module 216a and 225 of the camera modules 216a, 216b, and 225, at least one sensor module 217a and 226 of the sensor modules 217a, 217b, and 226, and/or the indicator may be disposed to be exposed through at least one display 230 and 400. For example, the at least one camera module 216a and 225, the at least one sensor module 217a and 226, and/or the indicator may be disposed under a display area of the displays 230 and 400 in an interior space of the at least one housing 210 and 220 and be disposed to contact an external environment through an opening or transparent area perforated to a cover member (e.g., a window layer of the first display 230 and/or the second rear cover 250). According to certain embodiments, an area in which the displays 230 and 400 and the at least one camera module 216a and 225 face each other is a part of an area displaying contents and may be formed as a transmission area having predetermined transmittance. According to certain embodiments, the transmission area may be formed to have transmittance in a range from approximately 5% to approximately 20%. Such a transmission area may include an area overlapped with an effective area (e.g., view angle area) of the at least one camera module 216a and 225 through which light for generating an image by an image sensor passes. For example, the transmission area of the displays 230 and 400 may include an area having a lower pixel density than that of a peripheral area thereof. For example, the transmission area may replace the opening. For example, the at least one camera module 216a and 225 may include an under display camera (UDC). In another embodiment, some camera modules or sensor modules 217a and 226 may be disposed to perform functions thereof without being visually exposed through the display. For example, an area facing the camera modules 216a and 225 and/or the sensor modules 217a and 226 disposed under the displays 230 and 400 (e.g., display panel) has an under display camera (UDC) structure; thus, a perforated opening may be unnecessary.

Figure 2:
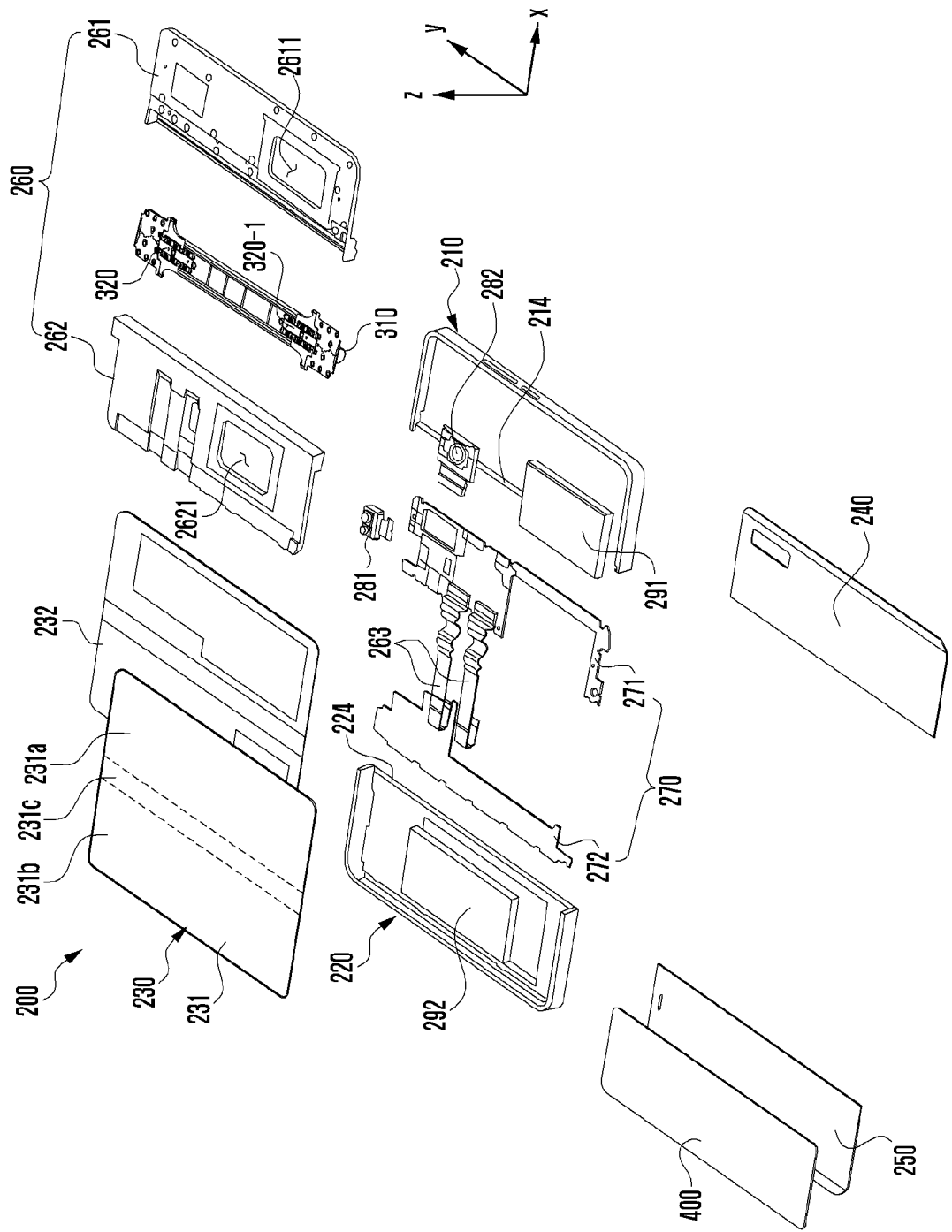
FIG. 2 is an exploded perspective view illustrating an electronic device according to various embodiments of the disclosure.

FIG. 2 is an exploded perspective view illustrating an electronic device 200 according to various embodiments of the disclosure.

Referring to FIG. 2, the electronic device 200 may include a first display 230, a second display 400, a hinge device 320, 320-1, a support member assembly 260, at least one printed circuit board 270, a first housing 210, a second housing 220, a first rear cover 240, and/or a second rear cover 250.

According to various embodiments, the first display 230 may include a display panel 231 (e.g., flexible display panel) and one or more plates 232 or layers in which the display panel 231 is seated. According to certain embodiments, the display panel 231 may include a first panel area 231a corresponding to the first area (e.g., the first area 230a of FIG. 1A) of the display 230, a second panel area 231b extended from the first panel area and corresponding to the second area (e.g., the second area 230b of FIG. 1A) of the display 230, and a third area 231c connecting the first panel area 231a and the second panel area 231b and corresponding to a folding area (e.g., the folding area 230c of FIG. 1A) of the display 230. According to certain embodiments, the one or more plates 232 may include a conductive plate (e.g., Cu sheet or SUS sheet) disposed between the display panel 231 and the support member assembly 260. According to certain embodiments, the one or more plates 232 may be formed to have substantially the same area as that of the first display 230, and an area facing a folding area (e.g., the folding area 230c of FIG. 1A) of the first display 230 may be formed to be bendable. According to certain embodiments, the one or more plates 232 may include at least one auxiliary material layer (e.g., graphite member) disposed at a rear surface of the display panel 231. According to certain embodiments, the one or more plates 232 may be formed in a shape corresponding to the display panel 231.

According to various embodiments, the second display 400 may be disposed in a space between the second housing 220 and the second rear cover 250. According to certain embodiments, the second display 400 may be disposed to be visible from the outside through substantially the entire area of the second rear cover 250 in a space between the second housing 220 and the second rear cover 250.

According to various embodiments, the support member assembly 260 may include a first support member 261 (e.g., first support plate) and a second support member 262 (e.g., second support plate). According to certain embodiments, the first support member 261 may be foldably coupled to the second support member 262 through the hinge device 320, 320-1. According to certain embodiments, the electronic device 200 may include at least one wiring member 263 (e.g., flexible printed circuit board (FPCB)) disposed from at least a portion of the first support member 261 across the hinge device 320, 320-1 to a portion of the second support member 262. According to certain embodiments, the support member assembly 260 may be disposed between one or more plates 232 and at least one printed circuit board 270. According to certain embodiments, the first support member 261 may be disposed between the first area (e.g., the first area 230a of FIG. 1A) of the first display 230 and a first printed circuit board 271. According to certain embodiments, the second support member 262 may be disposed between the second area (e.g., the second area 230b of FIG. 1A) of the first display 230 and a second printed circuit board 272. According to certain embodiments, the at least one wiring member 263 and/or at least a portion of the hinge device 320, 320-1 may be disposed to be supported through at least a portion of the support member assembly 260. According to certain embodiments, the at least one wiring member 263 may be disposed in a direction (e.g., x-axis direction) crossing the first support member 261 and the second support member 262. According to certain embodiments, the at least one wiring member 263 may be disposed in a direction (e.g., the x-axis direction) substantially perpendicular to the folding axis (e.g., the y-axis or the folding axis A of FIG. 1A) of the folding area 230c.

According to various embodiments, the at least one printed circuit board 270 may include a first printed circuit board 271 disposed to face the first support member 261 or a second printed circuit board 272 disposed to face the second support member 262. According to certain embodiments, the first printed circuit board 271 and the second printed circuit board 272 may be disposed in an inner space formed by the support member assembly 260, the first housing 210, the second housing 220, and the first rear cover 240, and/or the second rear cover 250. According to certain embodiments, the first printed circuit board 271 and the second printed circuit board 272 may include a plurality of electronic components disposed to implement various functions of the electronic device 200. In some embodiments, the first support member 261 is a component of the first housing 210 and may be extended at least partially from the first side member 213 to a first space (e.g., first interior space) in which the first housing 210 is formed. In some embodiments, the second support member 262 is a component of the second housing 220 and may be extended at least partially from the second side member 223 to a second space (e.g., second interior space) in which the second housing 220 is formed.

According to various embodiments, the electronic device 200 may include a first printed circuit board 271 disposed in a first space of the first housing 210, a first battery 291 disposed at a position facing a first swelling hole 2611 of the first support member 261, at least one camera module 282 (e.g., the first camera module 216a and/or the second camera module 216b of FIG. 1A), or at least one sensor module 281 (e.g., the first sensor module 217a and/or the second sensor module 217b of FIG. 1A). According to certain embodiments, the electronic device 200 may include a second printed circuit board 272 disposed in the second space of the second housing 220 or a second battery 292 disposed in a position facing a second swelling hole 2621 of the second support member 262. According to certain embodiments, the first housing 210 may be integrally formed with the first support member 261. According to certain embodiments, the second housing 220 may be integrally formed with the second support member 262.

According to various embodiments, the first housing 210 may include a first rotation support surface 214, and the second housing 220 may include a second rotation support surface 224 corresponding to the first rotation support surface 214. According to certain embodiments, the first rotation support surface 214 and the second rotation support surface 224 may include curved surfaces corresponding to (naturally connected to) a curved outer surface of the hinge housing 310. According to certain embodiments, when the electronic device 200 is in an unfolded state, the first rotation support surface 214 and the second rotation support surface 224 may cover the hinge housing 310, thereby not exposing the hinge housing 310 from the rear surface of the electronic device 200 or exposing only a portion thereof. According to certain embodiments, when the electronic device 200 is in a folded state, the first rotation support surface 214 and the second rotation support surface 224 may rotate along the curved outer surface of the hinge housing 310 to expose at least a portion of the hinge housing 310 to the rear surface of the electronic device 200.

According to various embodiments, the hinge device 320, 320-1 may include a hinge housing 310, and at least one hinge device 320 and 320-1 disposed in a receiving part (e.g., a receiving part 3101 of FIG. 3) of the hinge housing 310. According to certain embodiments, the hinge device s 320 and 320-1 may be fixed to the receiving part 3101 of the hinge housing 310 and be connected to the first support member 261 and the second support member 262 through at least one rotate (e.g., rotates 322, 323, 322-1 and 323-1 of FIG. 3).

FIG. 3 is an exploded perspective view illustrating an electronic device including a hinge device of the electronic device according to various embodiments of the disclosure.

Referring to FIG. 3, the electronic device 200 may include a first housing 210 including a first side member 213, a second housing 220 including a second side member 223, a hinge device 320, 320-1 for connecting the first housing 210 and the second housing 220 to be foldable with respect to each other, and a flexible display 230 (e.g., the first display 230 of FIG. 1) disposed to be supported through the first housing 210, the hinge device 320, 320-1, and the second housing 220. According to certain embodiments, the electronic device 200 may further include a first protective frame 235 coupled to the first housing 210 and a second protective frame 236 coupled to the second housing 220 with an edge of the flexible display 230 interposed therebetween. According to certain embodiments, the first housing 210 and the second housing 220 may operate to be folded or unfolded with respect to each other based on a folding axis A through the hinge device 320, 320-1.

According to various embodiments, the hinge device 320, 320-1 may be fixed to a receiving part 3101 of a hinge housing 310 having a length along a direction (e.g., the y-axis direction) substantially parallel to the folding axis A. The hinge device 320 and 320-1 may include a first hinge device 320 fixed to the receiving part 3101 of the hinge housing 310 and disposed in an upper area of the electronic device 200 and a second hinge device 320-1 fixed to the receiving part 3101 of the hinge housing 310 and disposed in a lower area of the electronic device 200. For example, the first hinge device 320 and the second hinge device 320-1 may have substantially the same configuration. According to certain embodiments, the first hinge device 320 may include a first rotation bracket 322 and second rotation bracket 323 for foldably connecting the first housing 210 and the second housing 220 with respect to each other. According to certain embodiments, the second hinge device 320-1 may include a third rotation bracket 322-1 and fourth rotation bracket 323-1 for connecting the first housing 210 and the second housing 220 to be foldable with respect to each other. According to certain embodiments, the third rotation bracket 322-1 and the fourth rotation bracket 323-1 may have substantially the same shape and the same disposition structure as those of the first rotation bracket 322 and the second rotation bracket 323.

According to various embodiments, the electronic device 200 may include a first plate 341 (e.g., first support plate or first conductive plate) disposed to cover at least a portion of the hinge device 320, 320-1 between the flexible display 230 and the first housing 210. According to certain embodiments, the electronic device 200 may include a second plate 342 (e.g., second support plate or second conductive plate) disposed to cover at least a portion of the hinge device 320, 320-1 between the flexible display 230 and the second housing 220. According to certain embodiments, at least a portion of the first plate 341 may be fixed to at least a portion of the first hinge device 320 and the second hinge device 320-1. According to certain embodiments, at least a portion of the second plate 342 may be fixed to at least a portion of the first hinge device 320 and the second hinge device 320-1. According to certain embodiments, at least a portion of the first plate 341 may be fixed to at least a portion of the first housing 210. According to certain embodiments, at least a portion of the second plate 342 may be fixed to at least a portion of the second housing 220. According to certain embodiments, when the electronic device is in the unfolded state, the first plate 341 and the second plate 342 may have a designated gap (e.g., a gap g of FIG. 4B) and be disposed to form a substantially same flat surface as that of the first support member 261 and the second support member 262, thereby helping to secure a support surface of the flexible display 230. According to certain embodiments, the at least one hinge device 320 and 320-1 may be connected to the first housing 210 and the second housing 220 through the at least one rotates 322, 323, 322-1, and 323-1.

According to exemplary embodiments of the disclosure, the first plate 341 and the second plate 342 may be at least partially disposed to be supported by at least one hinge device 320 and 320-1. For example, by having a transformed shape in at least some of components thereof and/or including an additional support structure, the at least one hinge device s 320 and 320-1 may include an extended support area for supporting the plates 341 and 342 in an area corresponding to the hinge device s 320 and 320-1, thereby helping to improve a performance of the flexible display 230 and/or the digitizer (e.g., at least one digitizer 460 of FIG. 4A).

Figure 4A:
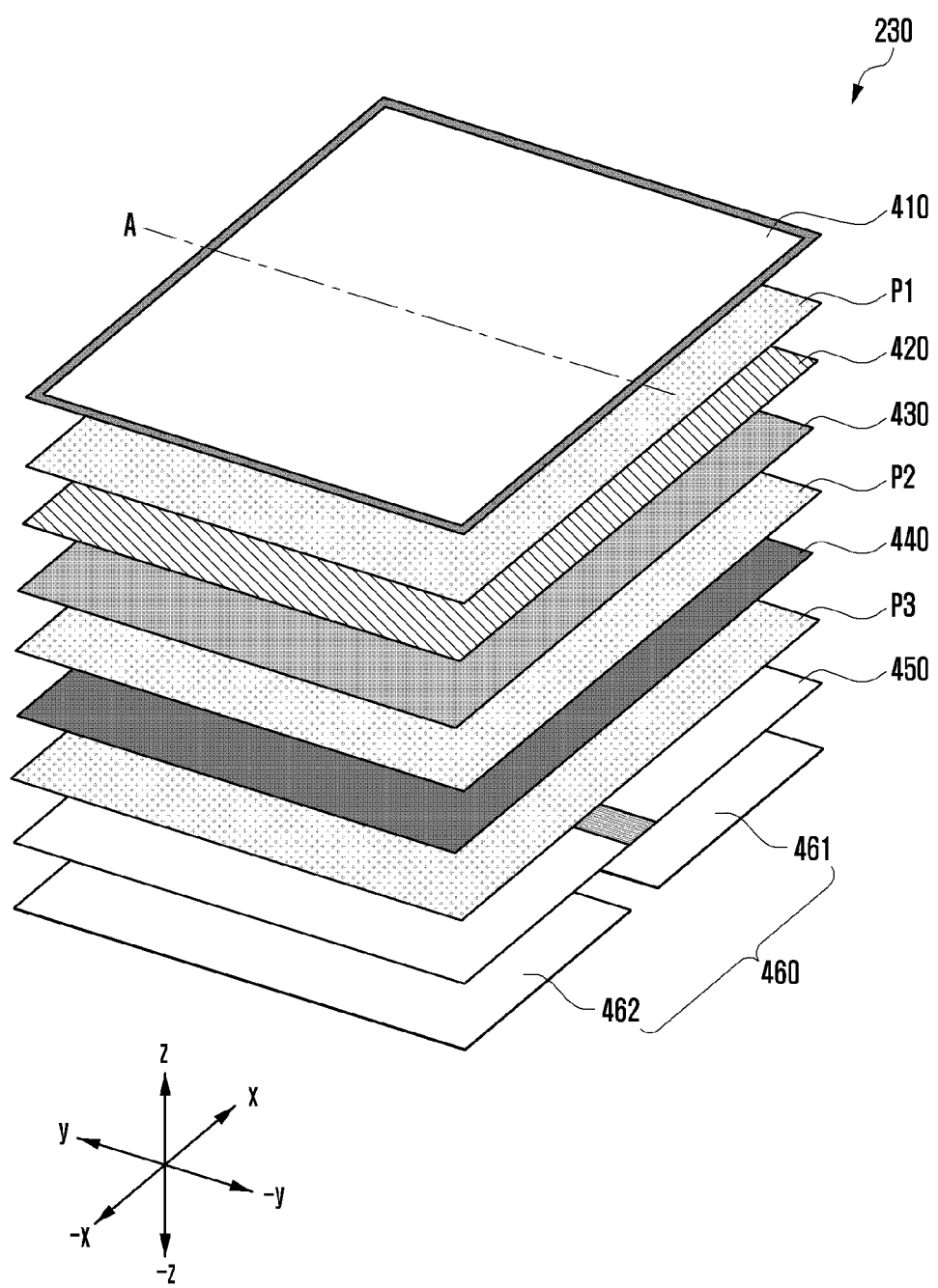
FIG. 4A is an exploded perspective view illustrating a flexible display according to various embodiments of the disclosure.
Figure 4B:
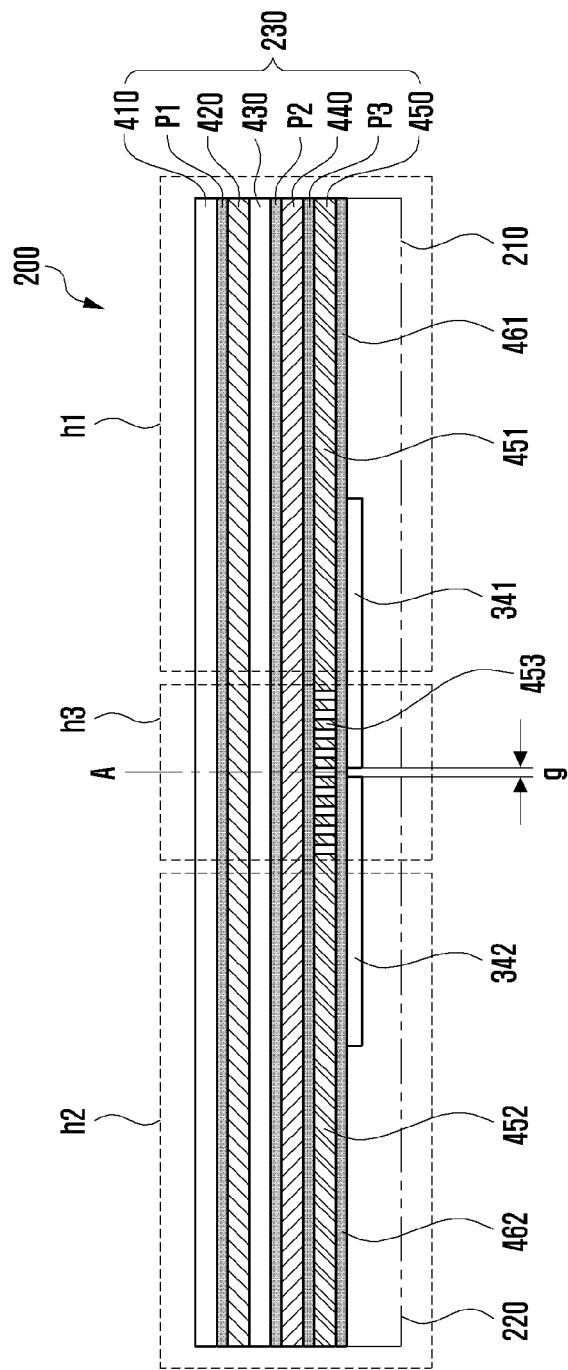
FIG. 4B is a cross-sectional view illustrating an electronic device taken along line 4b-4b of FIG. 1A according to various embodiments of the disclosure.

FIG. 4A is an exploded perspective view illustrating a flexible display according to various embodiments of the disclosure. FIG. 4B is a cross-sectional view illustrating an electronic device taken along line 4b-4b of FIG. 1A according to various embodiments of the disclosure.

The flexible display 230 according to exemplary embodiments of the disclosure may include an unbreakable (UB) type OLED display (e.g., curved display).

With reference to FIG. 4A, the flexible display 230 may include a window layer 410 and a polarizer (POL) 420 (e.g., polarizing film), a display panel 430, a polymer layer 440, a support plate 450, and at least one digitizer 460 sequentially disposed under the window layer 410. In some embodiments, the digitizer 460 may be disposed between the polymer layer 440 and the support plate 450 or between the display panel 430 and the polymer layer 440. In some embodiments, the flexible display 230 may include a first reinforcement plate disposed in an area corresponding to at least a portion of the first housing (e.g., the first housing 210 of FIG. 1A) and a second reinforcement plate disposed in an area corresponding to at least a portion of the second housing (e.g., the second housing 220 of FIG. 1A) under the at least one digitizer 460.

According to various embodiments, the window layer 410, the polarization layer 420, the display panel 430, the polymer layer 440, and the support plate 450 may be disposed to cross at least a portion of the first surface (e.g., the first surface 211 of FIG. 1A) of the first housing (e.g., the first housing 210 of FIG. 1A) and the third surface (e.g., the third surface 221 of FIG. 1A) of the second housing (e.g., the second housing 220 of FIG. 1A). According to certain embodiments, the at least one digitizer 460 may include a first digitizer 461 disposed in an area corresponding to the first housing (e.g., the first housing 210 of FIG. 1A) and a second digitizer 462 disposed in an area corresponding to the second housing (e.g., the second housing 220 of FIG. 1A) under the support plate 450. According to certain embodiments, although the first digitizer 461 and the second digitizer 462 are separated, in order to be recognized as a unified digitizer, the first digitizer 461 and the second digitizer 462 may be electrically connected to a substrate (e.g., the substrate assembly of FIG. 2) of the electronic device (e.g., the electronic device 200 of FIG. 2). In some embodiments, the at least one digitizer 460 may include a bendable digitizer disposed to cross at least a portion of the first surface (e.g., the first surface 211 of FIG. 1A) of the first housing (e.g., the first housing 210 of FIG. 1A) and the third surface (e.g., the third surface 221 of FIG. 1A) of the second housing (e.g., the second housing 220 of FIG. 1A). According to certain embodiments, the window layer 410, the polarization layer 420, the display panel 430, the polymer layer 440, the support plate 450, and the digitizer 460 may be attached to each other through adhesives P1, P2, and P3. For example, the adhesives P1, P2, and P3 may include at least one of an optical clear adhesive (OCA), a pressure sensitive adhesive (PSA), a heat-reactive adhesive, a general adhesive, or a double-sided tape.

According to various embodiments, the display panel 430 may include a plurality of pixels and a wiring structure (e.g., electrode pattern). According to certain embodiments, the polarization layer 420 may selectively transmit light generated in a light source of the display panel 430 and vibrating in a predetermined direction. According to certain embodiments, the display panel 430 and the polarization layer 420 may be integrally formed. According to certain embodiments, the flexible display 230 may include a touch panel.

According to various embodiments, the polymer layer 440 may be disposed under the display panel 430, thereby providing a dark background for securing visibility of the display panel 430, and be made of a cushioning material (e.g., cushioning layer) for a cushioning action. In some embodiments, in order to waterproof the flexible display 230, the polymer layer 440 may be removed or may be disposed under the support plate 450.

According to various embodiments, the support plate 450 may be formed in a shape that provides flexibility to the flexible display 230. According to certain embodiments, the support plate 450 may be made of a material capable of performing a detection operation of at least one digitizer 460 disposed below. For example, the support plate 450 may be made of a non-metal thin plate material such as fiber reinforced plastics (FRP) (e.g., carbon fiber reinforced plastics (CFRP) or glass fiber reinforced plastics (GFRP)) having rigid characteristics for supporting the display panel 430. According to certain embodiments, the support plate 450 may include a first flat portion 451 corresponding to the first housing (e.g., the first housing 210 of FIG. 1A), a second flat portion 452 corresponding to the second housing (e.g., the second housing 220 of FIG. 1A), and a bending portion 453 (flexible portion or bending portion) connecting the first flat portion 451 and the second flat portion 452. According to certain embodiments, the bending portion 453 may receive flexibility through a plurality of openings disposed at a predetermined interval. According to certain embodiments, a bending characteristic of the bending portion 453 may be determined through at least one of a size, a shape, or a disposition density of at least some of the plurality of openings. In some embodiments, the support plate 450 may be made of a metal material such as steel use stainless (SUS) (e.g., stainless steel (STS)), Cu, Al, or a metal CLAD (e.g., a laminated member in which SUS and Al are alternately disposed). In this case, the support plate 450 may include a plurality of openings formed over an entire area and through which an electromagnetic field may pass in order to induce a detection operation of the at least one digitizer 460 disposed thereunder. According to certain embodiments, the support plate 450 may help to reinforce rigidity of the electronic device (e.g., the electronic device 200 of FIG. 1A) and be used for shielding ambient noise, and dissipating a heat emitted from peripheral heat dissipating components.

According to various embodiments, the flexible display 230 may include at least one functional member disposed between the polymer layer 440 and the support plate 450 or under the support plate 450. According to certain embodiments, the functional member may include a graphite sheet for heat dissipation, an added display, a force touch FPCB, a fingerprint sensor FPCB, an antenna radiator for communication, or a conductive/non-conductive tape. According to certain embodiments, when bending of the functional member is impossible, the functional member may be individually disposed at the first housing (e.g., the first housing 210 of FIG. 1A) and the second housing (e.g., the second housing 220 of FIG. 1A). According to certain embodiments, when bending of the functional member is possible, the functional member may be disposed to cross from the first housing (e.g., the first housing 210 of FIG. 1A) to at least a portion of the second housing (e.g., the second housing 220 of FIG. 1A) through the hinge device (e.g., the hinge device 320, 320-1 of FIG. 2).

Referring to FIG. 4B, the electronic device (e.g., the electronic device 200 of FIG. 1) may include a first area h1 (e.g., first flat area) corresponding to the first housing 210, a second area h2 (e.g., second flat area) corresponding to the second housing 220, and a third area h3 (e.g., folding area) at least partially foldable and corresponding to the hinge device (e.g., the hinge device 320, 320-1 of FIG. 3). According to certain embodiments, the electronic device 200 may include a first digitizer 461 disposed in areas corresponding to portions of the first area h1 and the third area h3 and a second digitizer 462 disposed in areas corresponding to portions of the second area h2 and the third area h3 under the support plate 450. According to certain embodiments, at least a portion of the first digitizer 461 may be disposed to be supported through the first plate 341 disposed thereunder and covering at least a portion of the hinge device (e.g., the hinge device 320, 320-1 of FIG. 3). According to certain embodiments, at least a portion of the second digitizer 462 may be disposed to be supported through the second plate 342 disposed thereunder and covering at least a portion of the hinge device (e.g., the hinge device 320, 320-1 of FIG. 3). According to certain embodiments, the first digitizer 461 and the first plate 341 may be disposed to have a gap g from the second digitizer 462 and the second plate 342 at positions corresponding to at least a portion of the third area h3 when the electronic device is in an unfolded state. It may be advantageous that the gap g has a small size in order to secure a support area of the flexible display 230 disposed to receive support from the first housing 210, the first plate 341, the second housing 220, and the second plate 342.

According to various embodiments of the disclosure, the first plate 341 and the second plate 342 may be disposed to at least partially cover the hinge device (e.g., the hinge device 320, 320-1 of FIG. 3). For example, the first plate 341 and the second plate 342 may be disposed to cover a receiving part (e.g., the receiving part 3101 of FIG. 3) of the hinge housing (e.g., the hinge housing 310 of FIG. 3) when the electronic device is in an unfolded state. According to certain embodiments, the first plate 341 and the second plate 342 may be disposed at positions corresponding to at least a portion of the hinge device (e.g., the hinge device 320, 320-1 of FIG. 3) and be disposed to receive support from at least some components of the hinge device (e.g., the hinge device 320, 320-1 of FIG. 3) when the electronic device is in an unfolded state. Accordingly, when the electronic device is in an unfolded state, in order to firmly support the flexible display 230, it may be advantageous that the first plate 341 and the second plate 342 are supported by an extended support structure for some components of the hinge device (e.g., the hinge device 320 and 320-1 of FIG. 3).

Hereinafter, a support structure for supporting the hinge device 320 and the plates 341 and 342 will be described in detail.

Figure 5:
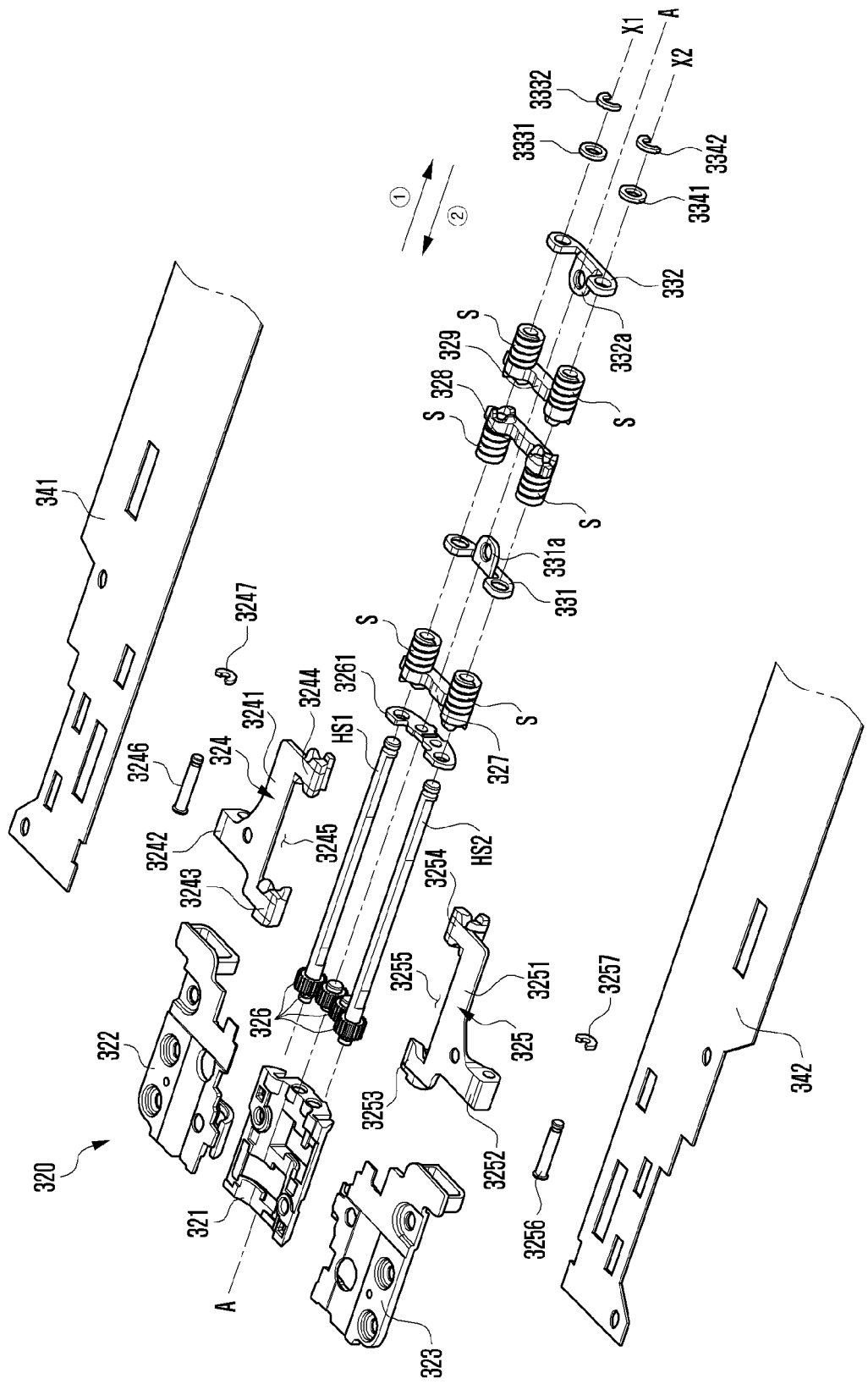
FIG. 5 is an exploded perspective view illustrating a hinge device according to various embodiments of the disclosure.

FIG. 5 is an exploded perspective view illustrating a hinge device according to various embodiments of the disclosure.

In describing FIG. 5, the first hinge device 320 of FIG. 3 has been illustrated and described, but the second hinge device 320-1 may also have substantially the same configuration and disposition structure.

Referring to FIG. 5, the electronic device (e.g., the electronic device 200 of FIG. 3) may include a first housing (e.g., the first housing 210 of FIG. 3), a second housing (e.g., the second housing 220 of FIG. 3), and a hinge device (e.g., the hinge device 320, 320-1 of FIG. 3) for foldably coupling the first housing 210 and the second housing 220. According to certain embodiments, the hinge device 320, 320-1 may include a first hinge device 320 (hereinafter, referred to as a 'hinge device') fixed to a receiving part (e.g., the receiving part 3101 of FIG. 3) of the hinge housing 310 and at least partially connected to the first housing 210 and the second housing 220.

According to various embodiments, the hinge device 320 may include a rotation bracket link 321 fixed to the receiving part (e.g., the receiving part 3101 of FIG. 3) of the hinge housing (e.g., the hinge housing 310 of FIG. 3), a first rotation bracket 322 rotatably fixed to one side of the rotation bracket link 321 with respect to the folding axis A, a second rotation bracket 323 rotatably fixed to the other side of the rotation bracket link 321 with respect to the folding axis A, a first arm 324 coupled to the first rotation bracket 322 and rotatably disposed based on a first rotation axis X1 through a first shaft HS1 disposed parallel to the folding axis A at one side of the folding axis A, a second arm 325 coupled to the second rotation bracket 323 and rotatably disposed based on a second rotation axis X2 through a second shaft HS2 disposed parallel to the folding axis A at the other side of the folding axis A, a plurality of hinge cams 327, 328, and 329 disposed in a manner in which the first shaft HS1 and the second shaft HS2 can be inserted through the plurality of hinge cams 327, 328, and 329, a plurality of springs S disposed in a manner in which the first shaft HS1 and the second shaft HS2 are inserted through the springs S and pressing the plurality of hinge cams 327, 328, and 329 in a designated direction (direction ①), washers 3331 and 3341 penetrating in the first shaft HS1 and the second shaft HS2 as a support structure for supporting the plurality of hinge cams 327, 328, and 329 and the plurality of springs S, and E-rings 3332 and 3342 as a fixing structure fixed to end portions of the first shaft HS1 and the second shaft HS2.

According to various embodiments, the first shaft HS1 and the second shaft HS2 may include a gear assembly 326 including a plurality of gears disposed at an end portion thereof. According to certain embodiments, the first arm 324 and the second arm 325 may be disposed to rotate by the same amount of rotation with respect to the folding axis A through the gear assembly 326. For example, the first shaft HS1 and the second shaft HS2 may be rotatably disposed at a designated angle along the first arm 324 and the second arm 325 interlocked with the first rotation bracket 322 and the second rotation bracket 323, respectively rotating based on the folding axis A in the rotation bracket link 321.

According to various embodiments, the first arm 324 may include a body 3241, a rotate coupling portion 3242 extended from one end of the body 3241 and coupled to the first rotation bracket 322, a first cam structure 3243 extended from the other end of the body 3241, and a second cam structure 3244 extended to have a separation space 3245 from the first cam structure 3243 at the other end of the body 3241. According to certain embodiments, the rotate coupling portion 3242 may be rotatably fixed with respect to the first rotation bracket 322 through a coupling pin 3246 and an E-ring 3247. According to certain embodiments, the first cam structure 3243 and the second cam structure 3244 may be coupled to the first shaft HS1 to perform an idle rotation (e.g., self-rotation) in a manner in which the first shaft HS1 can be inserted through the first cam structure 3243 and the second cam structure 3244. According to certain embodiments, the first cam structure 3243 and the second cam structure 3244 may include at least one curved part (e.g., first curved portions 3253a of FIG. 9A) protruded at a specified interval along a longitudinal direction (e.g., direction ① and/or direction ⑦) of the first shaft HS1 and a cam groove (e.g., first cam grooves 3253b of FIG. 9A) disposed between the at least one curved parts. According to certain embodiments, the second arm 325 may include a body 3251, a rotate coupling portion 3252, a first cam structure 3253, and a second cam structure 3254 disposed to have a separation space 3255 from the first cam structure formed in substantially the same manner as that of the first arm 324 and be rotatably coupled to the second rotation bracket 323 through a coupling pin 3256 and an E-ring 3257. According to certain embodiments, the second arm 325 may be coupled in a manner in which the second shaft HS2 can be inserted through the first cam structure 3253 and the second cam structure 3254.

According to various embodiments, the plurality of hinge cams 327, 328, and 329 may include a first hinge cam 327, second hinge cam 328, and third hinge cam 329 formed so that the first shaft HS1 and the second shaft HS2 may simultaneously and sequentially can be inserted through the first hinge cam 327, second hinge cam 328, and third hinge cam 329. According to certain embodiments, the hinge cams 327, 328, and 329 may be moved along a longitudinal direction (e.g., direction ① or direction ②) in the first shaft HS1 and the second shaft HS2 and be disposed not to perform an idle rotation. For example, the first shaft HS1 and the second shaft HS2 may be formed in a manner in which cross-sections thereof are D-cut, and the hinge cams 327, 328, and 329 also include through-holes of corresponding shapes; thus, the first shaft HS1 and the second shaft HS2 may be prevented from performing an idle rotation. According to certain embodiments, the hinge cams 327, 328, and 329 may include a curved portion (e.g., first curved portions 3253a of FIG. 9A) formed in the first cam structures 3243 and 3253 and the second cam structures 3244 and 3254 of the first arm 324 and the second arm 325, a curved portion (e.g., second curved portions 327a of FIG. 9C) formed to correspond to the cam groove (e.g., first cam grooves 3253b of FIG. 9A), and a cam groove (e.g., second cam grooves 327b of FIG. 9C) According to certain embodiments, the first hinge cam 327 and the second hinge cam 328 may be disposed within separation spaces 3245 and 3255 of the first arm 324 and the second arm 325. According to certain embodiments, the hinge device 320 may include a first shaft bracket 331 disposed between the first hinge cam 327 and the second hinge cam 328. According to certain embodiments, the first shaft bracket 331 may be fixed in a manner in which the first shaft HS1 and the second shaft HS2 can be inserted through the first shaft bracket 331 and may be fixed through a fastening member (e.g., screw) to the hinge housing (e.g., the hinge housing 310 of FIG. 3) through a fixing arm 331a. According to certain embodiments, the hinge device 320 may include springs S disposed between the first shaft bracket 331 and the first hinge cam 327. According to certain embodiments, the springs S may be disposed in a manner in which the first shaft HS1 and the second shaft HS2 can be inserted through the springs S. According to certain embodiments, the third hinge cam 329 may be coupled in a manner in which the first shaft HS1 and the second shaft HS2 can be inserted through the third hinge cam 329 so as for the third hinge cam 329 to face the second cam structures 3244 and 3254 at the outside of the first arm 324 and the second arm 325. According to certain embodiments, the hinge device 320 may include a second shaft bracket 332 disposed in a manner in which the first shaft HS1 and the second shaft HS2 can be inserted through the second shaft bracket 332 so as for the second shaft bracket 332 to face the third hinge cam 329. According to certain embodiments, the hinge device 320 may include springs S disposed between the second shaft bracket 332 and the third hinge cam 329. According to certain embodiments, the springs S may be disposed in a manner in which the first shaft HS1 and the second shaft HS2 can be inserted through the springs S. According to certain embodiments, the second shaft bracket 332 may be fixed in a manner in which the first shaft HS1 and the second shaft HS2 can be inserted through the second shaft bracket 332, and the hinge housing (e.g., of FIG. 3) and be fixed through a fastening member (e.g., screw) to the hinge housing 310 through a fixing arm 332a. According to certain embodiments, the hinge cams 327, 328, and 329, the springs S, and the shaft brackets 331 and 332 may be supported by the washers 3331 and 3341 coupled in a manner in which the first shaft HS1 and the second shaft HS2 can be inserted through the washers 3331 and 3341 and be prevented from being separated from the first shaft HS1 and the second shaft HS2 through the E-rings 3332 and 3342 and/or the C-ring coupled to end portions of the first shaft HS1 and the second shaft HS2. According to certain embodiments, the hinge device 320 may further include a gear assembly 326 and a stopper 3261 disposed between the first arm 324 and the second arm 325.

According to various embodiments, the plurality of hinge cams 327, 328, and 329 coupled in a manner in which the first shaft HS1 and the second shaft HS2 can be inserted through the hinge cams 327, 328, and 329 may be tightly coupled to the first cam structures 3243 and 3253 and the second cam structures 3244 and 3254 of the first arm 324 and the second arm 325. For example, the first hinge cam 327 may be disposed to be pressed in a direction (direction ②) of the first cam structures 3243 and 3253 of the first arm 324 and the second arm 325 through the springs S supported by one side of the first shaft bracket 331 in the separation space 3245 and 3255. According to certain embodiments, the second hinge cam 328 may receive support from the other side of the first shaft bracket 331 in the separation space 3245 and 3255 and be disposed to be pressed in a direction (direction) of the second cam structures 3244 and 3254 of the first arm 324 and the second arm 325 through the springs S. According to certain embodiments, the third hinge cam 329 may be disposed to be pressed in a direction (direction) of the second cam structures 3244 and 3254 through the springs S supported by the second shaft bracket 332 at the outside of the first arm 324 and the second arm 325. For example, when the first rotation bracket 322 coupled to the first housing (e.g., the first housing 210 of FIG. 3) and the second rotation bracket 323 coupled to the second housing (e.g., the second housing 220 of FIG. 3) rotate with respect to the folding axis A, while the first arm 324 and the second arm 325 move with a designated rotation angle with respect to the folding axis A, the first arm 324 and the second arm 325 may rotate by interlocking with the first rotation axis X1 and the second rotation axis X2. In this case, curved portions (e.g., first curved portions 3253a of FIG. 9A) of the first cam structures 3243 and 3253 and the second cam structures 3244 and 3254 formed in the first arm 324 and the second arm 325 rotate in a manner in which the curved portions ride over the curved portions (e.g., second curved portions 327a of FIG. 9C) of the hinge cams 327, 328, and 329, and the hinge cams 327, 328, and 329, which cannot rotate by themselves, may be pushed while retaining an elastic force (e.g., restoring force) of the spring, so that when the electronic device 200 receives a specified torque according to unfolding and folding operations (e.g., including a free stop function) and is operated at a specified angle (e.g., inflection angle) or more, the electronic device 200 may receive a rotational force that may automatically rotate in a folding direction or an unfolding direction.

According to various embodiments, the electronic device (e.g., the electronic device 200 of FIG. 3) may include a first plate 341 coupled to a first housing (e.g., the first housing 210 of FIG. 3) and disposed to cover at least a portion of the hinge device 320 and a second plate 342 coupled to the second housing (e.g., the second housing 220 of FIG. 3) and disposed to cover at least a portion of the hinge device 320. According to certain embodiments, the receiving part (e.g., the receiving part 3101 of FIG. 3) of the hinge housing (e.g., the hinge housing 310 of FIG. 3) may be covered through disposition of the first plate 341 and the second plate 342. According to certain embodiments, the first plate 341 may be disposed to receive support from at least a portion of the first rotation bracket 322 and the hinge device 320. According to certain embodiments, the second plate 342 may be disposed to receive support from at least a portion of the second rotation bracket 323 and the hinge device 320. For example, when the electronic device (e.g., the electronic device 200 of FIG. 3) is in an unfolded state, the first plate 341 and the second plate 342 may be at least partially supported by a plate-shaped first rotation bracket 322 and second rotation bracket 323. According to certain embodiments, the first plate 341 and the second plate 342 are disposed to receive support from the first and second cam structures 3243, 3253, 3244, and 3254 of the first arm 324 and the second arm 325, the hinge cams 327, 328, and 329 and/or the shaft brackets 331 and 332 in an area (e.g., a torque generating area T of FIG. 6B) corresponding to the hinge device 320, thereby helping to secure a stable support structure.

In certain embodiments, the second hinge device (e.g., the second hinge device 320-1 of FIG. 3) may be also disposed to support at least a portion of the first plate 341 and the second plate 342 through the above-described support structure configured substantially the same as that of the first hinge device 320.

Figure 6A:
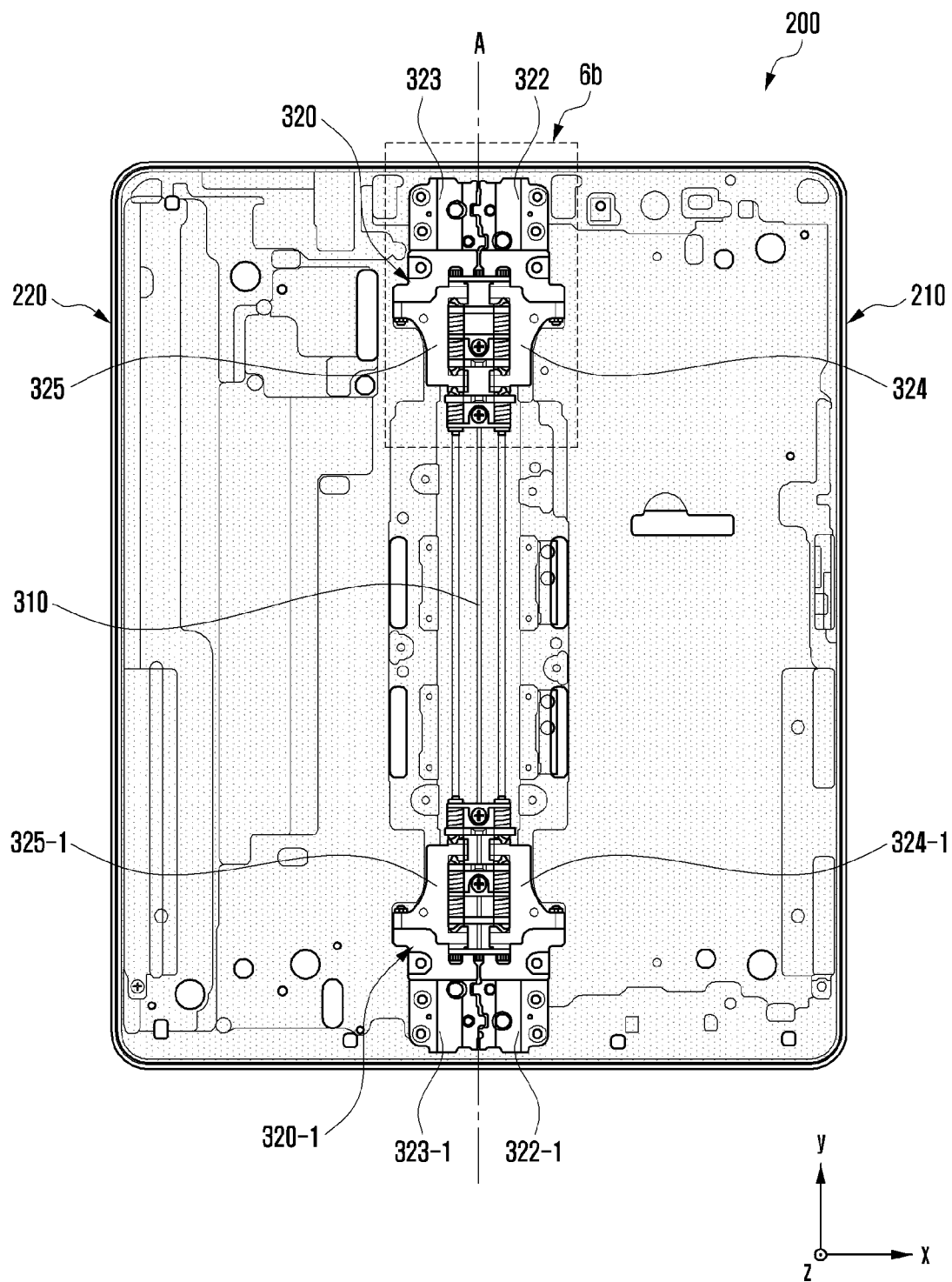
FIG. 6A is a plan view illustrating an electronic device including a hinge device according to various embodiments of the disclosure.
Figure 6B:
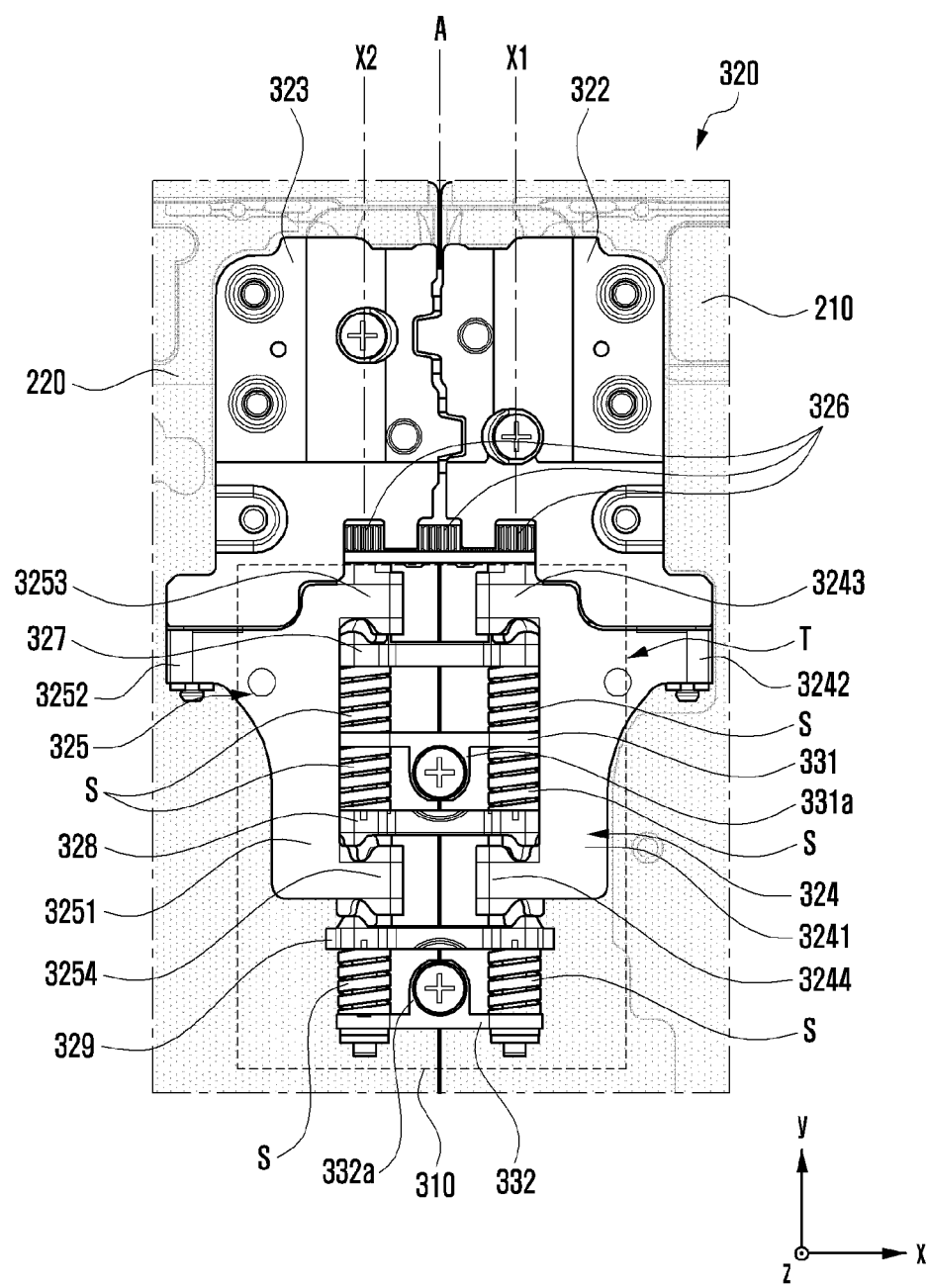
FIG. 6B is an enlarged view illustrating an area 6B of FIG. 6A according to various embodiments of the disclosure.

FIG. 6A is a plan view illustrating an electronic device including a hinge device according to various embodiments of the disclosure. FIG. 6B is an enlarged view illustrating an area 6B of FIG. 6A according to various embodiments of the disclosure. The electronic device of FIGS. 6A and 6B illustrates a state in which the flexible display is omitted.

In describing the hinge device 320 of FIGS. 6A and 6B, the same reference numerals are assigned to the components substantially the same as those of the hinge device 320 of FIG. 5, and a detailed description thereof may be omitted.

Referring to FIGS. 6A and 6B, the electronic device 200 may include a first housing 210, a second housing 220, and a hinge device 320, 320-1 connecting the first housing 210 and the second housing 220. According to certain embodiments, the hinge device 320, 320-1 may include a pair of hinge device s 320 and 320-1 disposed in the receiving part (e.g., the receiving part 3101 of FIG. 3) of the hinge housing (e.g., the hinge housing 310 of FIG. 3). According to certain embodiments, the pair of hinge device s 320 and 320-1 may include a first hinge device 320 disposed above the electronic device 200 in the receiving part 3101 of the hinge housing 310 and a second hinge device 320-1 disposed under the electronic device 200. According to certain embodiments, the first hinge device 320 and the second hinge device 320-1 may have substantially the same configuration. According to certain embodiments, the first hinge device 320 may include a first rotation bracket 322 connected to the first housing 210 and a second rotation bracket 323 connected to the second housing 220. According to certain embodiments, the second hinge device 320-1 may include a third rotation bracket 322-1 connected to the first housing 210 and a fourth rotation bracket 323-1 connected to the second housing 220. According to certain embodiments, the first hinge device 320 may include a first arm 324 disposed to interlock with the first rotation bracket 322 and a second arm 325 disposed to interlock with the second rotation bracket 323. According to certain embodiments, the second hinge device 320-1 may include a third arm 324-1 disposed to be interlocked with the third rotation bracket 322-1 and a fourth arm 325-1 disposed to be interlocked with the fourth rotation bracket 323-1. According to certain embodiments, the first hinge device 320 may include a torque generating area T in which a torque is generated by rotation of the first arm 324 and the second arm 325. According to certain embodiments, the torque generating area T may include a plurality of hinge cams 327, 328, and 329 disposed to be movable along the first rotation axis X1 and the second rotation axis X2 by interlocking with a rotation of the first arm 324 and the second arm 325, a plurality of springs S for pressing the plurality of hinge cams 327, 328, and 329, and at least one shaft bracket 331 and 332 disposed between the plurality of hinge cams 327, 328, and 329 to support the springs S and for fixing the hinge device s 320 and 320-1 to the hinge housing 310. According to certain embodiments, a structure of the second hinge device 320-1 and a coupling structure in which the second hinge device 320-1 is connected to the first housing 210 and the second housing 220 may be substantially the same as a structure of the first hinge device 320 and a coupling structure in which the first hinge device 320 is connected to the first housing 210 and the second housing 220.

According to various embodiments, when the electronic device 200 is changed to a folded or unfolded state, the first rotation bracket 322 and the third rotation bracket 322-1 connected to the first housing 210 and the second rotation bracket 323 and the fourth rotation bracket 323-1 connected to the second housing 220 may rotate based on the folding axis A. For example, the first housing 210 and the second housing 220 may rotate in the same amount of rotation based on the folding axis A through the gear assembly 326. In this case, the first arm 324 connected to the first rotation bracket 322 and the third arm 324-1 connected to the third rotation bracket 322-1 also rotate based on the first rotation axis X1, and the second arm 325 connected to the second rotation bracket 323 and the fourth arm 325-1 connected to the fourth rotation bracket 323-1 may also rotate based on the second rotation axis X2. According to certain embodiments, when the first arm 324 and the second arm 325 rotate, in the torque generating area T, curved portions (e.g., first curved portions 3253a of FIG. 9A) of the first cam structures 3243 and 3253 and the second cam structures 3244 and 3254 may rotate in a manner in which the curved portions ride over the curved portions (e.g., second curved portions 327a of FIG. 9C) of the hinge cams 327, 328, and 329, and the hinge cams 327, 328, and 329, which cannot be rotated by themselves, may be pushed in a direction (direction ① or direction ②) of the first rotation axis X1 and the second rotation axis X2 while retaining an elastic force (e.g., restoring force) of the spring S; thus, the electronic device 200 may receive a torque according to unfolding and folding operations. In this case, the first arm 324 and the second arm 325 may perform an idle rotation with respect to the first shaft HS1 and the second shaft HS2, and the plurality of hinge cams 327, 328, and 329 may not perform an idle rotation, but may move only in a longitudinal direction (direction ① or direction ②) of the first shaft HS1 and the second shaft HS2.

Figure 7A:
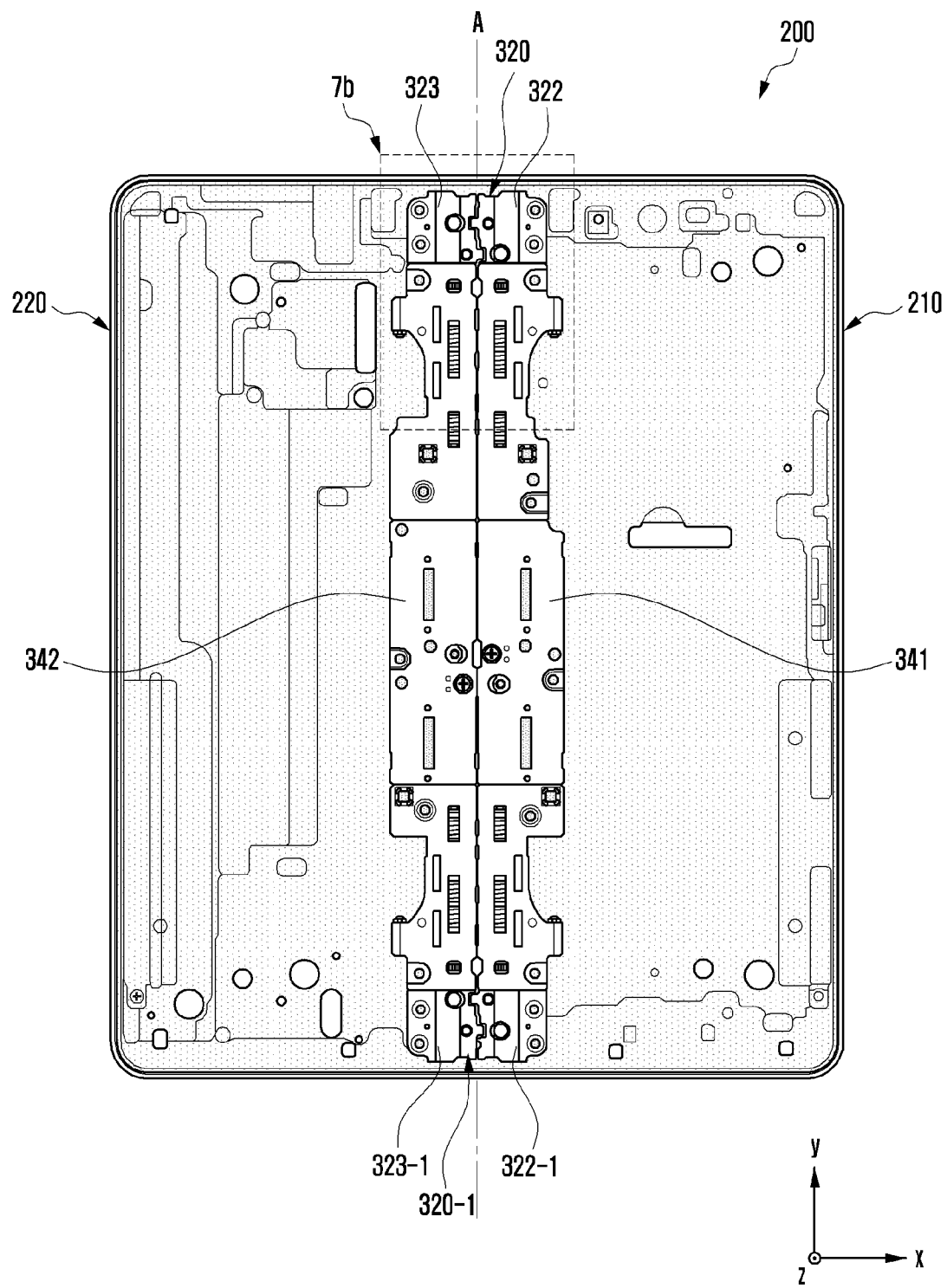
FIG. 7A is a plan view illustrating an electronic device in which a first plate and a second plate covering a hinge device are disposed according to various embodiments of the disclosure.
Figure 7B:
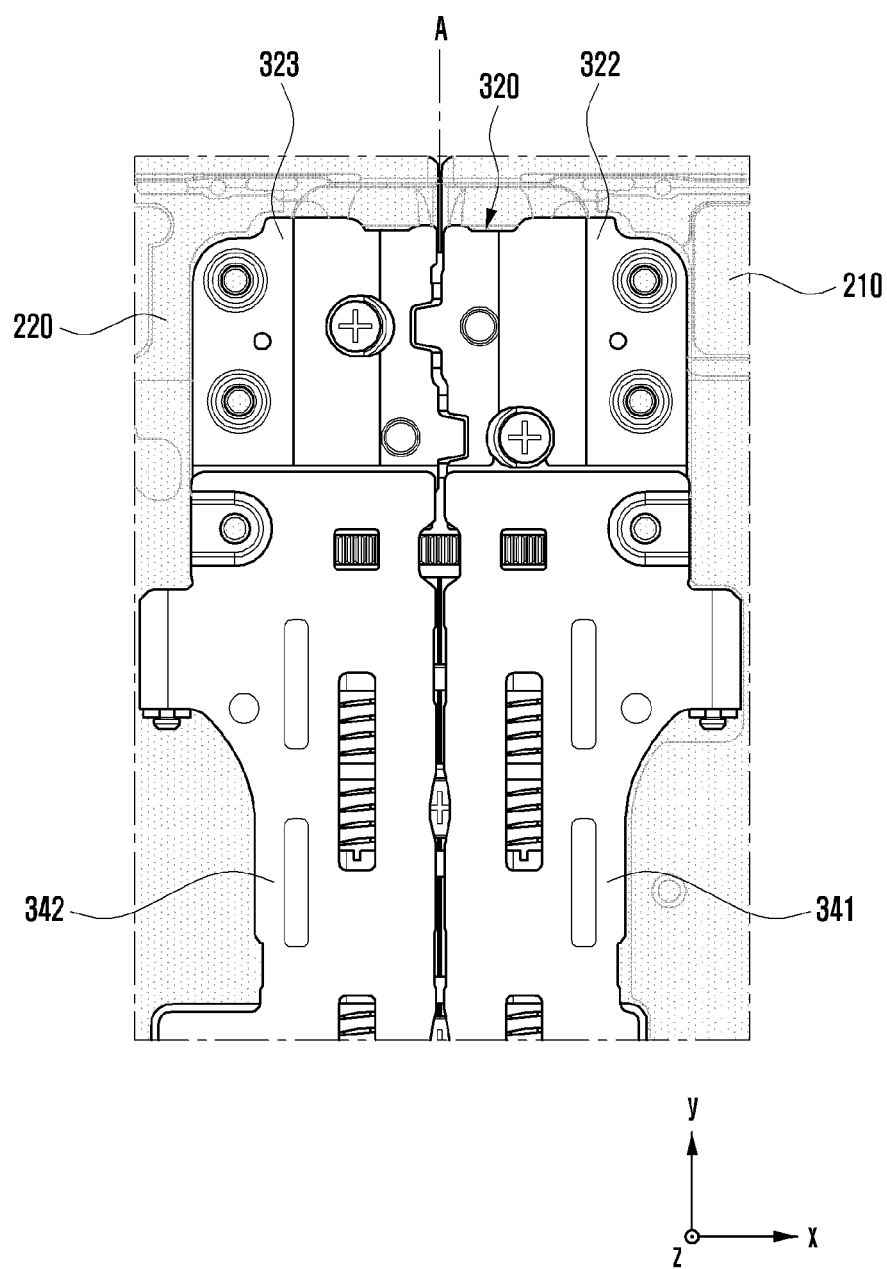
FIG. 7B is an enlarged view illustrating an area 7B of FIG. 7A according to various embodiments of the disclosure.

FIG. 7A is a plan view illustrating an electronic device in which a first plate and a second plate covering a hinge device are disposed according to various embodiments of the disclosure. FIG. 7B is an enlarged view illustrating an area 7b of FIG. 7A according to various embodiments of the disclosure.

In describing the electronic device 200 and the hinge device 320 of FIGS. 7A and 7B, the same reference numerals are given to substantially the same components as those of the electronic device 200 and the hinge device 320 of FIGS. 6A and 6B, and a detailed description thereof may be omitted.

Referring to FIGS. 7A and 7B, the electronic device 200 may include a first plate 341 disposed to cover at least a portion of the first housing 210 and the hinge device 320, 320-1 and a second plate 342 disposed to cover at least a portion of the second housing 220 and the hinge device 320, 320-1. According to certain embodiments, the first plate 341 and the second plate 342 may be made of a polymer material or a metal material. According to certain embodiments, the first plate 341 may be disposed in a manner overlapping with at least a portion of the first rotation bracket 322, the torque generating area (e.g., the torque generating area T of FIG. 6B) of the hinge device (the hinge device 320 of FIG. 6B), and the receiving part (e.g., the receiving part 3101 of FIG. 3) of the hinge housing (e.g., the hinge housing 310 of FIG. 3). According to certain embodiments, the second plate 342 may be disposed in a manner overlapping with at least a portion of the second rotation bracket 323, the torque generating area (e.g., the torque generating area T of FIG. 6B) of the hinge device (e.g., the hinge device 320 of FIG. 6B), and the receiving part (e.g., the receiving part 3101 of FIG. 3) of the hinge housing (e.g., the hinge housing 310 of FIG. 3). According to certain embodiments, when the electronic device 200 is in an unfolded state, the first plate 341 and the second plate 342 are disposed to form substantially the same flat surface as that of the first housing 210 and the second housing 220 and are disposed to form a substantially the same flat surface as that of a non-overlapping area of the first rotation bracket 322 and the second rotation bracket 323, thereby helping to secure a support area of the flexible display (e.g., the flexible display 230 of FIG. 3). According to certain embodiments, the first plate 341 and the second plate 342 may be fixed to the first housing 210 and the second housing 220 through a fastening member (e.g., screw). According to certain embodiments, the first plate 341 and the second plate 342 may be fixed to at least a portion of the first rotation bracket 322 and at least a portion of the second rotation bracket 323 through the fastening member (e.g., screw). Accordingly, at least a portion of the first plate 341 may be disposed to be supported through at least a portion of the first rotation bracket 322 and at least a portion of the hinge device 320, and at least a portion of the second plate 342 may be disposed to be supported through at least a portion of the second rotator 323 and at least a portion of the hinge device 320.

Figure 8:
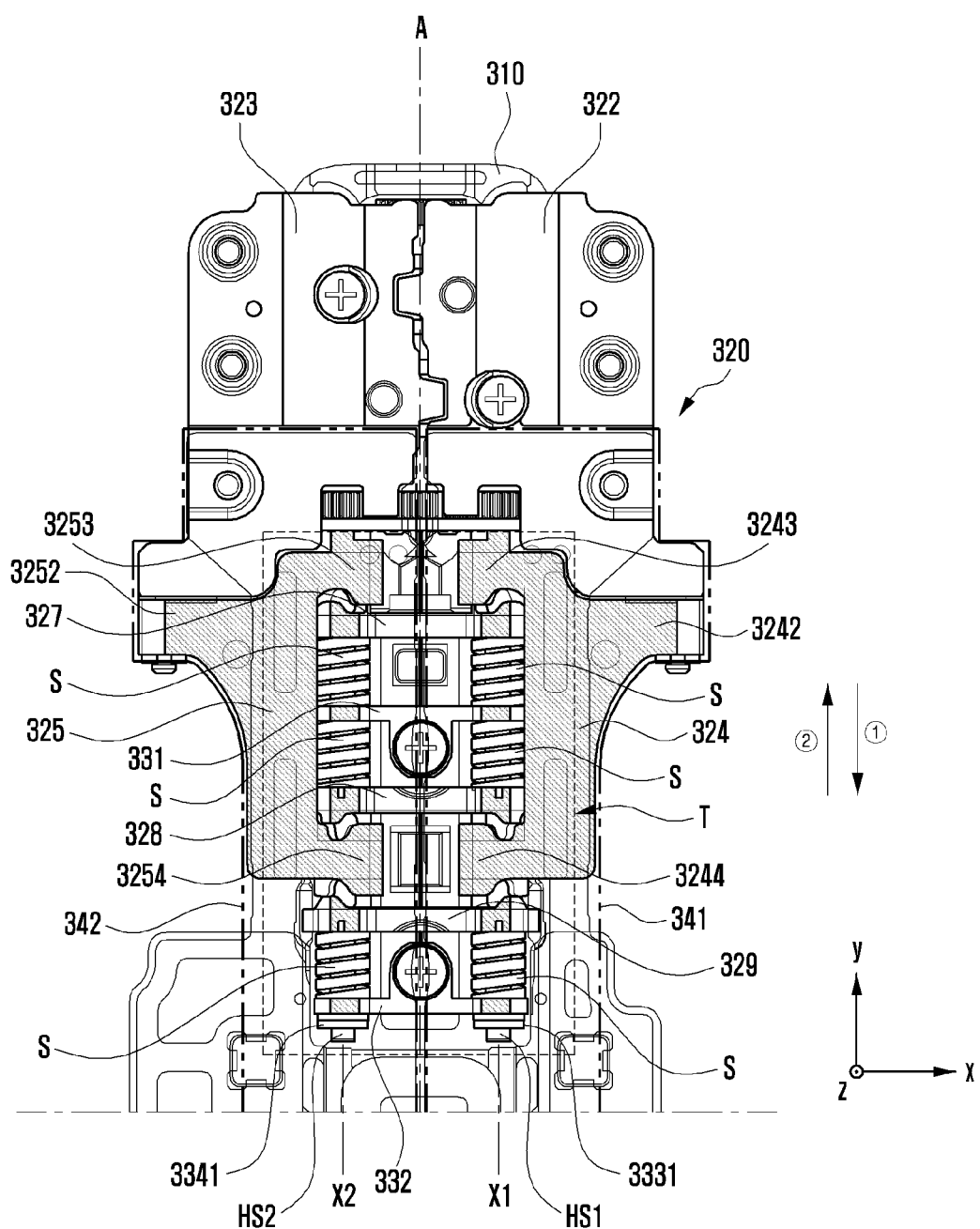
FIG. 8 is a diagram illustrating a support area of a hinge device for supporting a first plate and a second plate according to various embodiments of the disclosure.

FIG. 8 is a diagram illustrating a support area of a hinge device for supporting a first plate and a second plate according to various embodiments of the disclosure.

In describing the hinge device of FIG. 8, the same reference numerals are assigned to the components substantially the same as those of the hinge device of FIG. 6B, and a detailed description thereof may be omitted.

Referring to FIG. 8, the first plate 341 may be disposed to receive support from at least a partial area of the first rotation bracket 322 and a partial area of the hinge device 320. According to certain embodiments, the second plate 342 may be disposed to receive support from at least a partial area of the second rotation bracket 323 and the remaining partial areas of the hinge device 320. For example, the first plate 341 and the second plate 342 may be disposed to receive support from the arms 324 and 325 of the hinge device 320, a plurality of hinge cams 327, 328, and 329 operating by rotation of the arms 324 and 325, and the shaft brackets 331 and 332 disposed between the hinge cams 327, 328, and 329.

According to exemplary embodiments of the disclosure, in the torque generating area T of the hinge device 320 disposed under the first plate 341 and the second plate 342, as the first plate 341 and the second plate 342 have a wide support area, it may be advantageous that the first plate 341 and the second plate 342 support the flexible display (e.g., the flexible display 230 of FIG. 3). Accordingly, the hinge device 320 may include a modified support structure for each component for supporting the first plate 341 and the second plate 342 in the torque generating area T.

According to various embodiments, the hinge device 320 may include rotation elements disposed in the torque generating area T and rotating together with the first rotation axis X1 and the second rotation axis X2 according to a folding operation of the electronic device (e.g., the electronic device 200 of FIG. 3) and non-rotation elements that do not rotate according to a folding operation. For example, the rotation elements may include a first arm 324 and second arm 325 disposed to rotate with respect to the first rotation axis X1 according to a folding operation of the electronic device (e.g., the electronic device 200 of FIG. 3). According to certain embodiments, the non-rotation elements may include a plurality of hinge cams 327, 328, and 329 moving only in a longitudinal direction (e.g., direction ① or direction ②) of the first rotation axis X1 and the second rotation axis X2 by interlocking with the rotation of the arms 324 and 325, and shaft brackets 331 and 332 disposed between the hinge cams 327, 328, and 329. Accordingly, when the electronic device (e.g., the electronic device 200 of FIG. 3) is in an unfolded state, it may be advantageous that the rotation elements are disposed to have a maximum wide support area for supporting the first plate 341 and the second plate 342. According to certain embodiments, when the electronic device (e.g., the electronic device 200 of FIG. 3) is in an unfolded state, it may be advantageous that the non-rotation elements have a shape for supporting the rear surfaces of the first plate 341 and the second plate 342.

According to various embodiments, when the electronic device (e.g., the electronic device 200 of FIG. 3) is in an unfolded state, as the body 3241, at least a portion of the coupling portion 3242, at least a portion of the first cam structure 3243, and at least a portion of the second cam structure 3244 are in contact with the first plate 341, the first arm 324 may be positioned to support the first plate 341. In this case, an area of the first arm 324 in contact with the first plate 341 may be formed in a plane for stable support. According to certain embodiments, when the electronic device (e.g., the electronic device 200 of FIG. 3) is in an unfolded state, as the body 3251, at least a portion of the coupling portion 3252, at least a portion of the first cam structure 3253, and at least a portion of the second cam structure 3254 contact the second plate 342, the second arm 325 may be positioned to support the second plate 342. In this case, an area of the second arm 325 in contact with the second plate 342 may be formed in a plane for stable support.

According to various embodiments, when the electronic device (e.g., the electronic device 200 of FIG. 3) is in an unfolded state, at least a portion of the first shaft bracket 331 and at least a portion of the second shaft bracket 332 may be disposed to be in contact with the rear surface of the first plate 341 and the second plate 342. In this case, an area of the first shaft bracket 331 and the second shaft bracket 332 in contact with the first plate 341 and the second plate 342 may be formed in a plane for stable support.

Figure 9A:
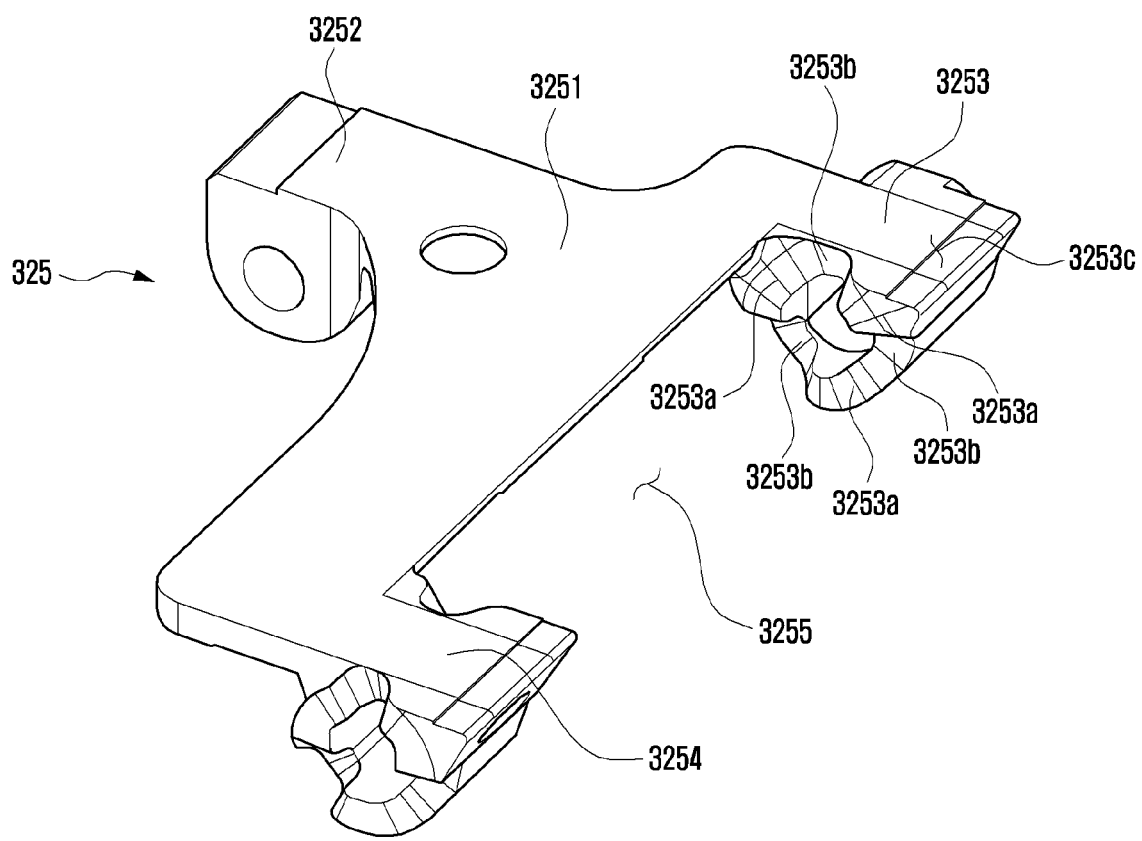
FIG. 9A is a perspective view illustrating an arm according to various embodiments of the disclosure.
Figure 9B:
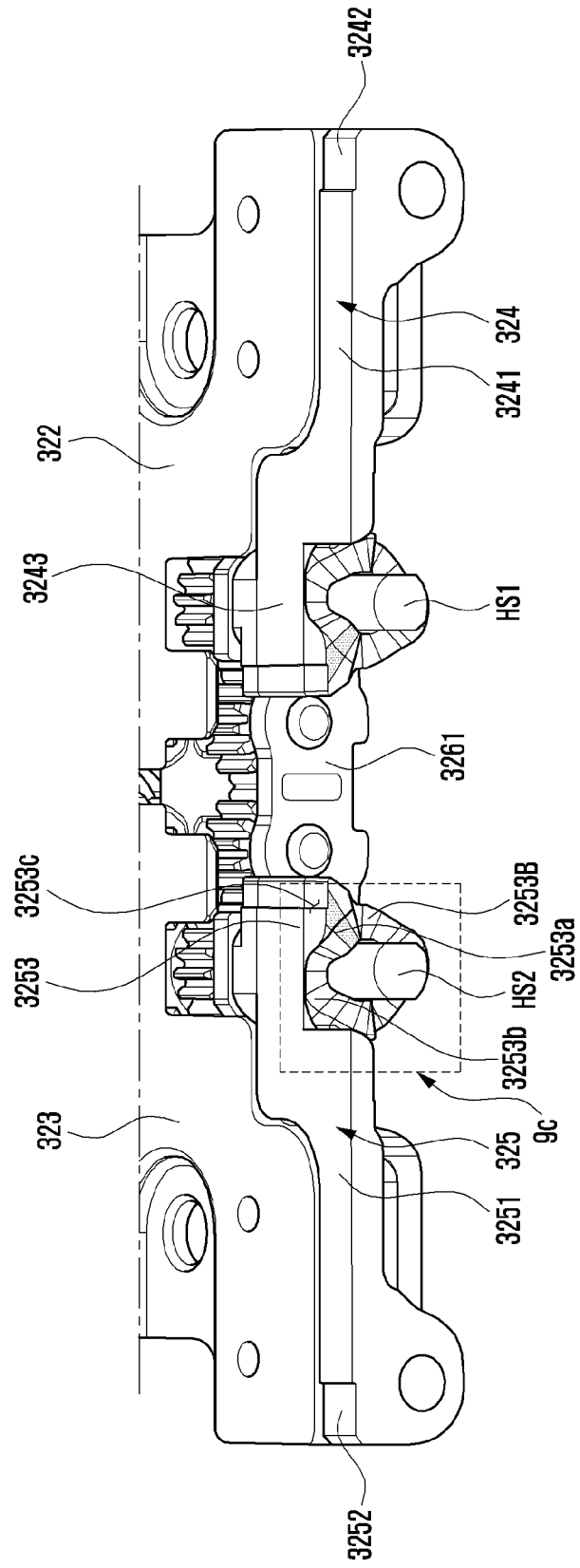
FIG. 9B is a partial perspective view illustrating a disposition constitution of arms in an unfolded state of an electronic device according to various embodiments of the disclosure.
Figure 9C:
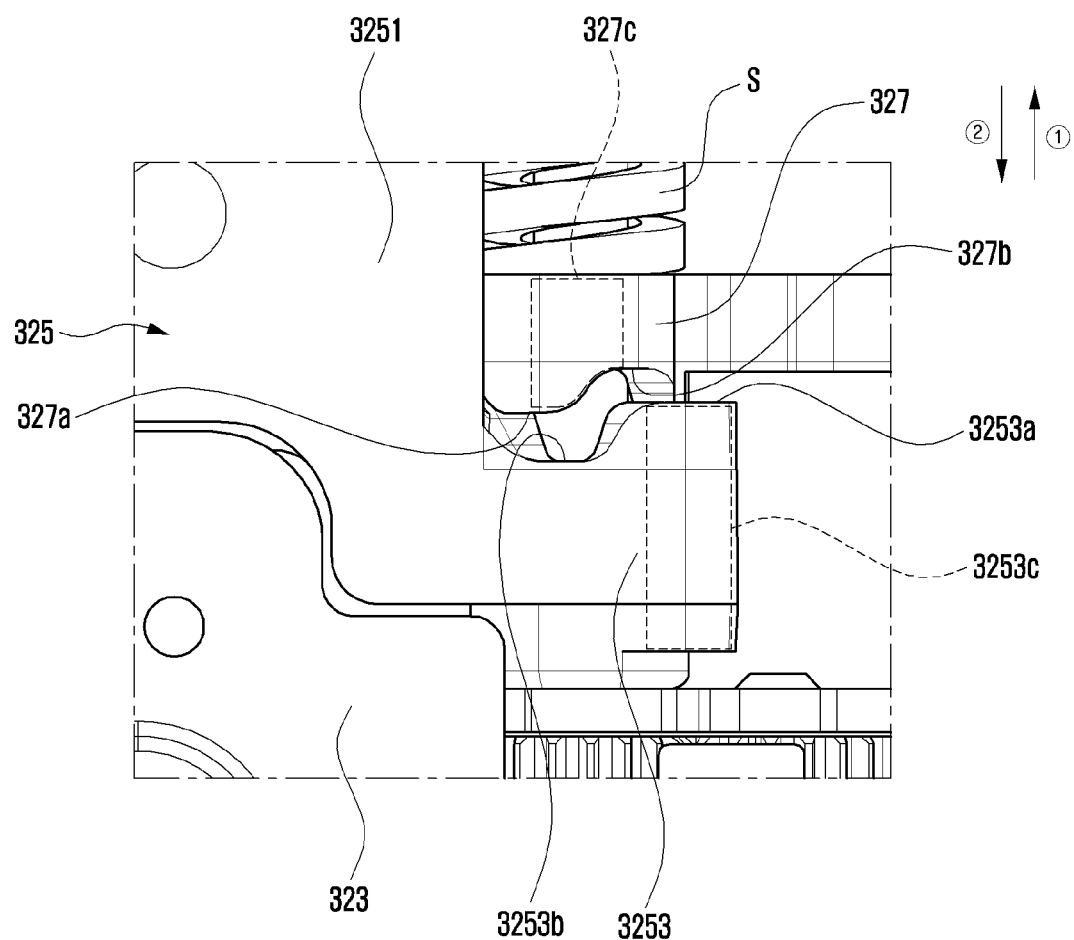
FIG. 9C is a diagram illustrating an area 9c of FIG. 9B viewed from another angle according to various embodiments of the disclosure.

FIG. 9A is a perspective view illustrating an arm according to various embodiments of the disclosure. FIG. 9B is a partial perspective view illustrating a disposition configuration of arms in an unfolded state of an electronic device according to various embodiments of the disclosure. FIG. 9C is a diagram illustrating an area 9c of FIG. 9B viewed from another angle according to various embodiments of the disclosure.

FIGS. 9A to 9C illustrate an interlocking structure of the first cam structure 3253 and the first hinge cam 327 of the second arm 325, but the second cam structure 3254 of the second arm 325, the cam structures 3243 and 3244 of the first arm 324, and an interlocking structure of the hinge cams 327, 328 and 329 may also be substantially the same.

Referring to FIGS. 9A to 9C, the second arm 325 may include a body 3251, a coupling portion 3252 extended to one side of the body 3251 and rotatably coupled to the second rotation bracket 323, a first cam structure 3253 extended to the other side of the body 3251, and a second cam structure 3254 disposed to have a separation space 3255 from the first cam structure 3253 at the other side. According to certain embodiments, the first cam structure 3253 and the second cam structure 3254 may be disposed in a manner in which the second shaft HS2 can be inserted through the first came structure 3253 and the second cam structure 3254. According to certain embodiments, the first cam structure 3253 may include first curved portions 3253a protruded to have a specified interval at the separation space 3255 and first cam grooves 3253b disposed between the first curved portions 3253a. According to certain embodiments, the first curved portions 3253a and the first cam grooves 3253b may be formed in a curved shape.

According to various embodiments, the first hinge cam 327 may also include second curved portions 327a formed in a similar manner and second cam grooves 327b disposed between the second curved portions 327a. For example, the first cam structure 3253 and the first hinge cam 327 may be disposed in a manner in which the second shaft HS2 can be inserted through the first cam structure 3253 and the first hinge cam 327 and in which the first curved portions 3253a and the second curved portions 327a face each other. According to certain embodiments, the second arm 325 may be disposed to perform an idle rotation (e.g., self-rotation) with respect to the second shaft HS2. According to certain embodiments, the first hinge cam 327 may be disposed to move only in a direction of the second rotation axis X2 (e.g., direction ① or direction ②) with respect to the second shaft HS2 and not to perform an idle rotation. According to certain embodiments, the first hinge cam 327 may be disposed to be pressed in a direction (direction ②) of the first cam structure 3253 through the spring S. Accordingly, when the second arm 325 rotates with respect to the second rotation shaft X2, the first curved portions 3253a at least partially seated in the second cam grooves 327b may be separated from the second cam grooves 327b and come in contact with the second curved portions 327a to push the first hinge cam 327 in a direction opposite to that of the first cam structure 3253 (direction ①). In this case, because the first hinge cam 327 moves backward while being supported by the spring S, a torque may be generated through an elastic force of the spring S. According to certain embodiments, when the electronic device (e.g., the electronic device 200 of FIG. 3) is in an unfolded state, the first curved portions 3253a may be disposed to position between the second curved portions 327a and the second cam grooves 327b; thus, the electronic device (e.g., the electronic device 200 of FIG. 3) may receive a torque to be continuously unfolded. In some embodiments, when the electronic device (e.g., the electronic device 200 of FIG. 3) is in a closed state, the first curved portions 3253a may be disposed to position between the second curved portions 327a and the second cam grooves 327b; thus, the electronic device (e.g., the electronic device 200 of FIG. 3) may receive a torque to continuously close.

According to various embodiments, the first cam structure 3253 may be positioned to support at least partially the second plate (e.g., the second plate 342 of FIG. 8) when the electronic device is in the unfolded state. In this case, when the electronic device is in an unfolded state, it may be advantageous that the first cam structure 3253 is formed so that any one first curved portion 3253a of the first curved portions 3253a protruded in a direction of the separation space 3255 is disposed at a position in contact with the second plate 342 (e.g., the second plate 342 of FIG. 8). According to certain embodiments, a contact area 3253c in which the first cam structure 3253 comes contact with the second plate (e.g., the second plate 342 of FIG. 8) may be formed in a plane, thereby helping to secure a stable support area. According to certain embodiments, a contact area 327c in which the first hinge cam 327 comes contact with the second plate (e.g., the second plate 342 of FIG. 8) may be formed in a plane, thereby helping to secure a stable support area.

According to various embodiments, a second cam structure 3254 interlocked with the second hinge cam (e.g., the second hinge cam 328 of FIG. 8) and the third hinge cam (e.g., the third hinge cam 329 of FIG. 8), the first cam structure 3243 of the first arm 324 interlocked with the first hinge cam 327, and the second cam structure (e.g., the second cam structure 3244 of FIG. 8) of the first arm 324 interlocked with the second hinge cam (e.g., the second hinge cam 328 of FIG. 8) and the third hinge cam (e.g., the third hinge cam 329 of FIG. 8) may be also formed in the same manner.

Figure 10A:
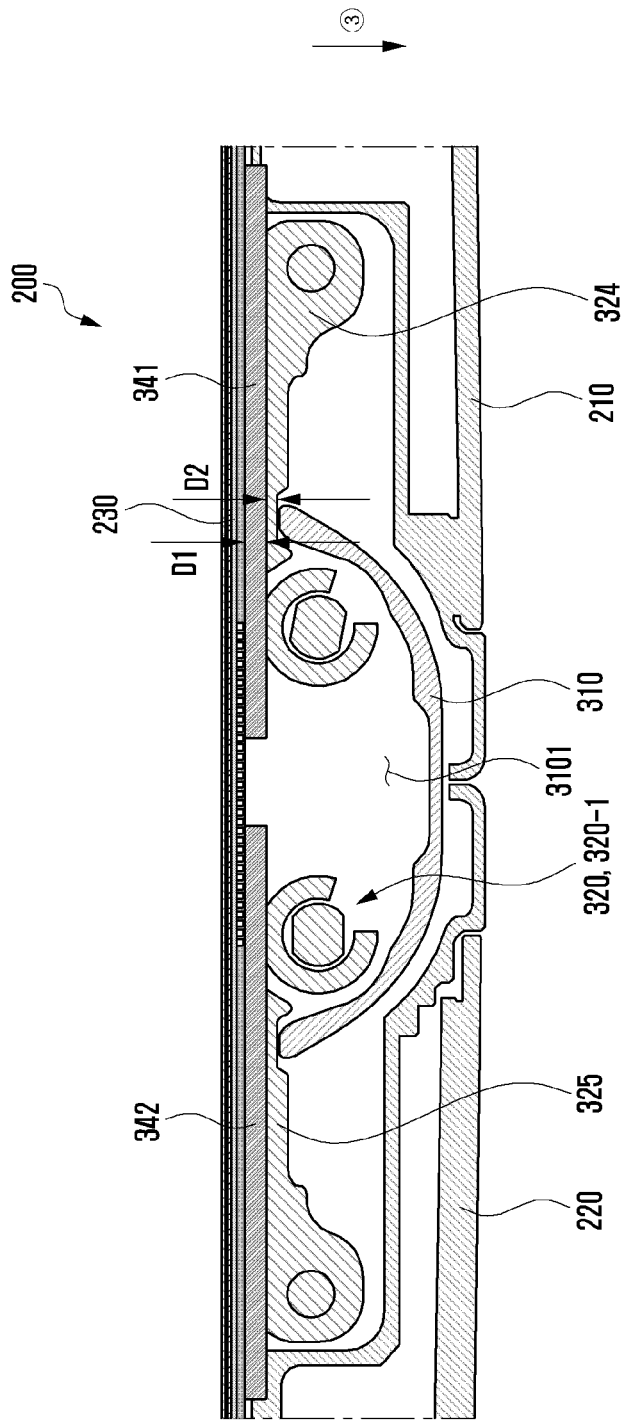
FIG. 10A is a schematic diagram of an electronic device illustrating a thickness relationship of plates and arms in an unfolded state according to various embodiments of the disclosure.
Figure 10B:
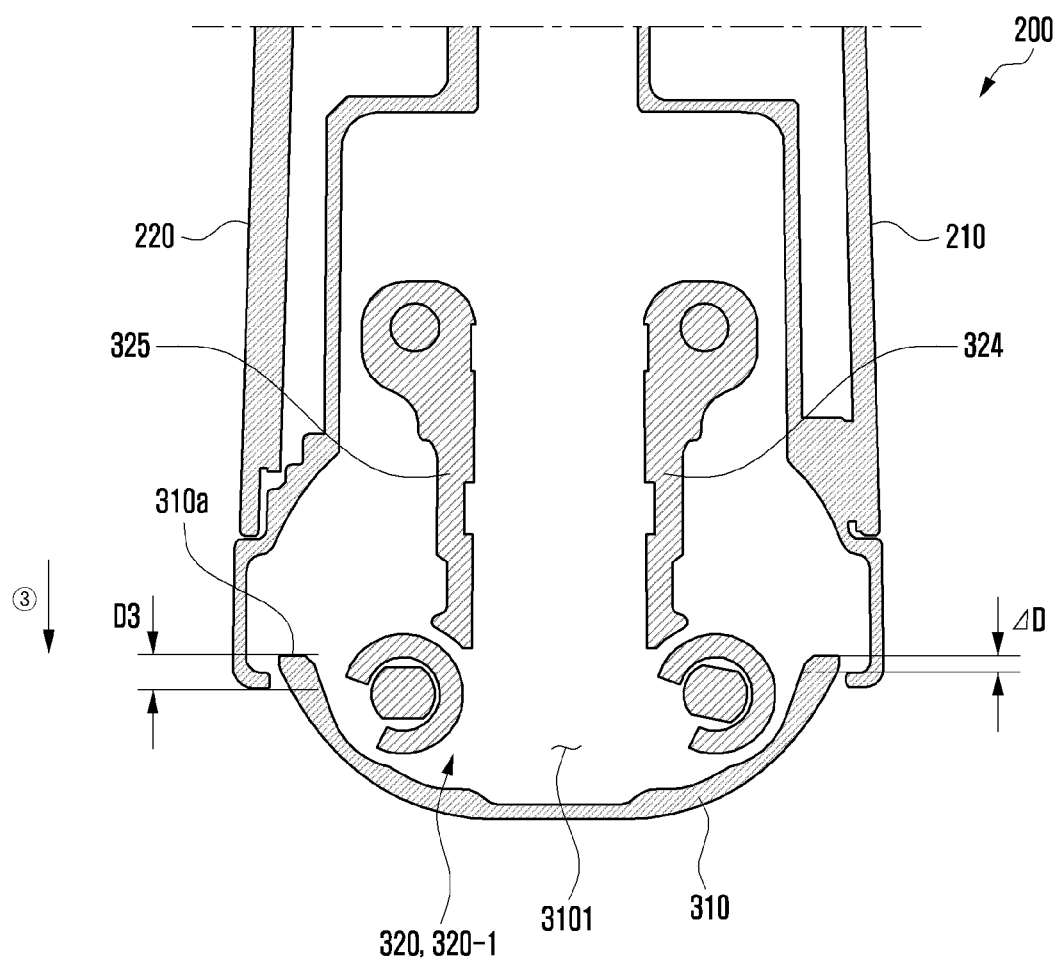
FIG. 10B is a schematic diagram of an electronic device illustrating a thickness relationship of arms according to an overlap amount of a hinge housing, a first housing, and a second housing in a folded state according to various embodiments of the disclosure.

FIG. 10A is a schematic diagram of an electronic device illustrating a thickness relationship of plates and arms in an unfolded state according to various embodiments of the disclosure. FIG. 10B is a schematic diagram of an electronic device illustrating a thickness relationship of arms according to an overlap amount of a hinge housing, a first housing, and a second housing in a folded state according to various embodiments of the disclosure.

Referring to FIGS. 10A and 10B, the electronic device 200 may include a first housing 210, a second housing 220, and a hinge device 320, 320-1 connecting the first housing 210 and the second housing 220. According to certain embodiments, the hinge device 320, 320-1 may include at least one hinge device 320 (e.g., the hinge device s 320 and 320-1 of FIG. 3) disposed in the receiving part 3101 of the hinge housing 310. According to certain embodiments, the at least one hinge device 320 may include a first arm 324 coupled to interlock with a first rotation bracket (e.g., the first rotation bracket 322 of FIG. 8) connected to the first housing 210 and a second arm 325 coupled to interlock with a second rotation bracket (e.g., the second rotation bracket 323 of FIG. 8) connected to the second housing 220. According to certain embodiments, the electronic device 200 may include a first plate 341 connected to the first housing 210 and disposed to overlap at least a portion (e.g., the body 3241 of FIG. 8) of the first arm 324 and a second plate 342 connected to the second housing 220 and disposed to overlap at least a portion (e.g., the body 3251 of FIG. 8) of the second arm 325. According to certain embodiments, when the electronic device 200 is in an unfolded state, the first arm 324 and the second arm 325 come into contact with the hinge housing 310 to determine an unfolding angle (e.g., 180 degrees). For example, when viewed from the outside of the electronic device 200, both ends of the hinge housing 310 may be overlapped to have a designated overlap amount D3 with the first housing 210 and the second housing 220 in order to form an aesthetic appearance and protect the hinge device.

According to various embodiments, the first plate 341 may determine a first thickness D1 so as to have sufficient rigidity to support the flexible display 230 disposed thereon. Accordingly, in a state in which the first thickness D1 is determined, a second thickness D2 of the first arm 324 overlapped with the first plate 341 may be reduced, which may cause rigidity degradation of the electronic device 200 and cause a decrease in operational stability.

According to an exemplary embodiment of the disclosure, at least one hinge device 320 may be disposed to move in a direction (direction ①) of the receiving part 3101, and increase an overlap amount D3 between the first housing 210, the second housing 220, and the hinge housing 310; thus, the end portion of the hinge housing 310 may be omitted by a specified length ΔD. Accordingly, when the electronic device is in an unfolded state, a thickness D2 of the first arm 324 in contact with the hinge housing 310 is increased by an omitted length ΔD, thereby helping to reinforce rigidity of the electronic device 200 and secure operational stability. According to certain embodiments, the thickness of the second arm 325 may also be increased in the same manner.

Figure 11A:
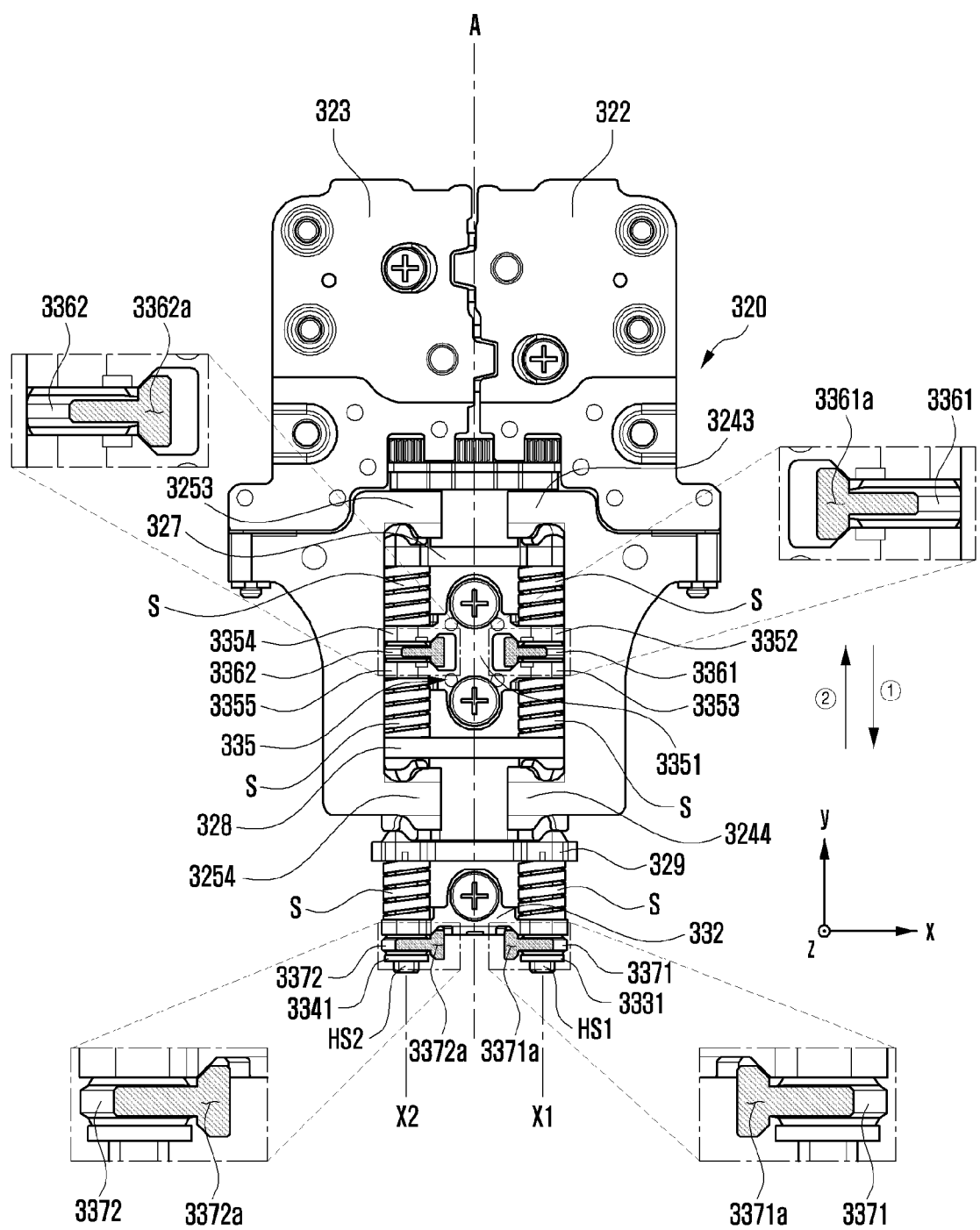
FIG. 11A is a diagram illustrating a support area of a hinge device for supporting a first plate and a second plate according to various embodiments of the disclosure.
Figure 11B:
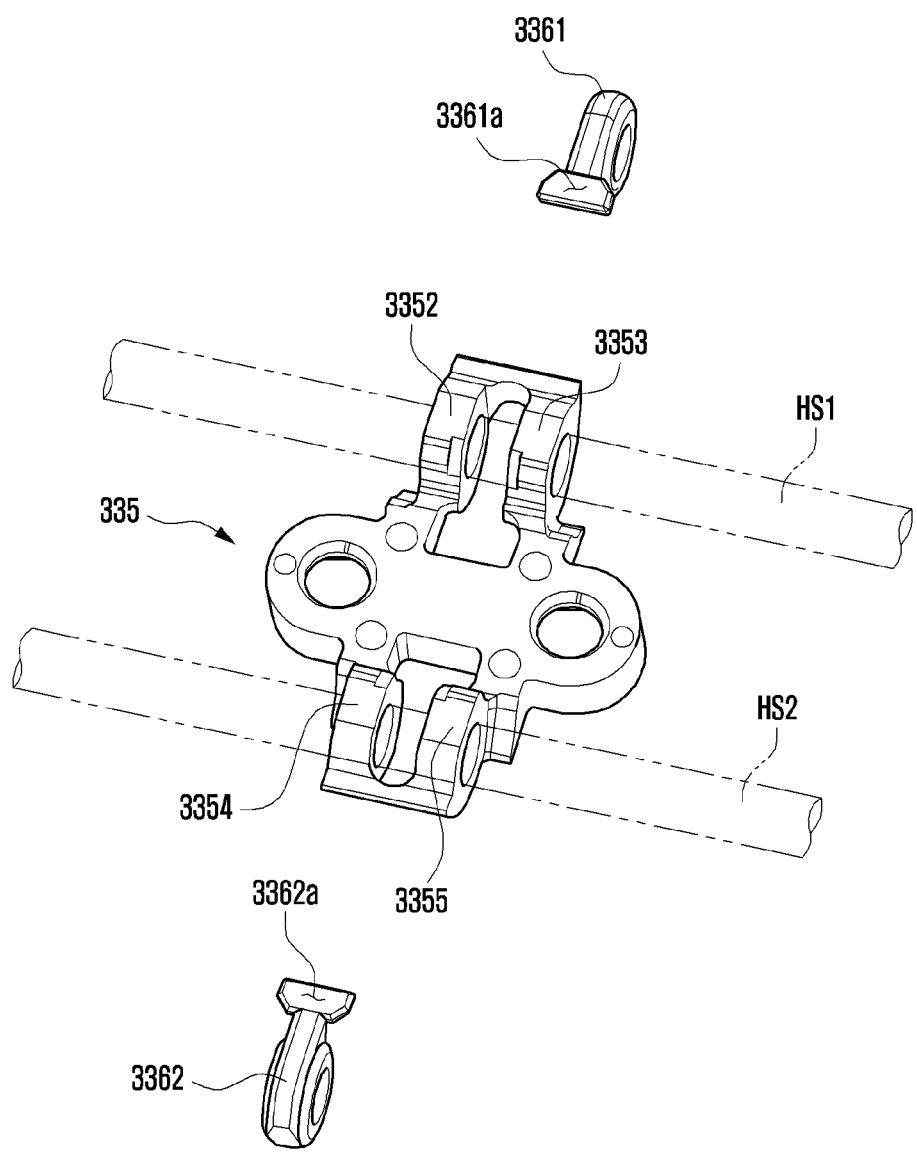
FIG. 11B is an exploded perspective view illustrating a first shaft bracket, a first support structure, and a second support structure according to various embodiments of the disclosure.

FIG. 11A is a diagram illustrating a support area of a hinge device for supporting a first plate and a second plate according to various embodiments of the disclosure. FIG. 11B is an exploded perspective view illustrating a first shaft bracket, a first support structure, and a second support structure according to various embodiments of the disclosure.

In describing the hinge device 320 of FIGS. 11A and 11B, the same reference numerals are assigned to the components substantially the same as those of the hinge device 320 of FIG. 8, and a detailed description thereof may be omitted.

Referring to FIGS. 11A and 11B, the hinge device 320 may include an additional support structures 3361, 3362, 3371, and 3372 for supporting the first plate (e.g., the first plate 341 of FIG. 8) and the second plate (e.g., the second plate 342 of FIG. 8) disposed thereon. According to certain embodiments, the support structures 3361 and 3362 may include a first support structure 3361 and second support structure 3362 disposed at a periphery of the first shaft bracket 335. According to certain embodiments, the first shaft bracket 335 (e.g., the first shaft bracket 331 of FIG. 5) may include a housing fixing part 3351 for being fixed to the hinge housing (e.g., the hinge housing 310 of FIG. 8), a pair of first shaft fixing parts 3352 and 3353 extended to one side from the housing fixing part 3351 and spaced apart from each other at a specified interval, and a pair of second shaft fixing parts 3354 and 3355 extended to the other side from the housing fixing part 3351 and spaced apart from each other at a specified interval. According to certain embodiments, the first shaft fixing parts 3352 and 3353 may be coupled to the first shaft HS1 in a manner in which the first shaft HS1 can be inserted into the first shaft fixing parts 3352 and 3353, and the second shaft fixing parts 3354 and 3355 may be coupled to the second shaft HS2 in a manner in which the second shaft HS2 can be inserted through the second shaft fixing parts 3354 and 3355. According to certain embodiments, the first support structure 3361 may be coupled between the pair of first shaft fixing parts 3352 and 3353 in a manner in which the first shaft HS1 can be inserted through the first support structure 3361 and include a flat contact area 3361a for contacting the rear surface of the first plate (e.g., the first plate 341 of FIG. 8). According to certain embodiments, the second support structure 3362 may be coupled between the pair of second shaft fixing parts 3354 and 3355 in a manner in which the second shaft HS2 can be inserted through the second support structure 3362 and include a flat contact area 3362a for contacting the rear surface of the second plate (e.g., the second plate 342 of FIG. 8).

According to various embodiments, the support structures 3371 and 3372 may include a third support structure 3371 coupled in a manner in which the first shaft HS1 can be inserted through and disposed between the second shaft bracket 332 and the washer 3331, and a fourth support structure 3372 coupled in a manner in which the second shaft HS2 can be inserted through the and disposed between the second shaft bracket 332 and the washer 3341. According to certain embodiments, the third support structure 3371 and the fourth support structure 3372 may include flat contact areas 3371a and 3372a formed in substantially the same manner as that of the first support structure 3361 and the second support structure 3362 and for contacting the rear surfaces of the first plate (e.g., the first plate 341 of FIG. 8) and the second plate (e.g., the second plate 342 of FIG. 8).

According to various embodiments, the electronic device (e.g., the electronic device 200 of FIG. 3) may include a first housing (e.g., the first housing 210 of FIG. 3), a second housing (e.g., the second housing 220 of FIG. 3), and at least one hinge device (e.g., the hinge device 320 of FIG. 8) for rotatably coupling the first housing and the second housing with respect to a folding axis (e.g., the folding axis A of FIG. 8), wherein the at least one hinge device includes a rotation bracket link (e.g., the rotation bracket link 321 of FIG. 5), a first rotation bracket (e.g., the first rotation bracket 322 of FIG. 8) rotatably coupled to the rotation bracket link with respect to the folding axis and connected to the first housing, a second rotation bracket (e.g., the second rotation bracket 323 of FIG. 8) rotatably coupled to the rotation bracket link with respect to the folding axis and connected to the second housing, a first arm (e.g., the first arm 324 of FIG. 8) rotatably disposed based on the first rotating shaft (e.g., the first rotating axis X1 of FIG. 8) of a first shaft (e.g., the first shaft HS1 of FIG. 8) coupled to the first rotation bracket and disposed parallel to the folding axis at one side of the folding axis, and a second arm (e.g., the second arm 325 of FIG. 8) coupled to the second rotation bracket and rotatably disposed based on the second rotation axis (e.g., the second rotation axis (X2) of FIG. 8) of the second shaft (e.g., the second shaft HS2 of FIG. 8) disposed parallel to the folding axis at the other side of the folding axis, a flexible display (e.g., the flexible display 230 of FIG. 3) disposed to receive support from the first housing, the second housing, and the hinge device, a first plate (e.g., the first plate 341 of FIG. 8) disposed to at least partially overlap the first arm under the flexible display and coupled to the first housing, and a second plate (e.g., the second plate 342 of FIG. 8) disposed to at least partially overlap the second arm under the flexible display and coupled to the second housing, wherein when the electronic device is in an unfolded state, the first arm and the second arm may have the second plate and a support area (e.g., the contact area 3253c of FIG. 9C) for supporting the second plate.

According to various embodiments, the first arm may include a body and at least one cam structure extended from the body and disposed in a manner in which the first shaft can be inserted through the first arm, and the at least one cam structure may be coupled to perform an idle rotation to the first shaft.

According to various embodiments, the electronic device may include at least one hinge cam disposed to face the at least one cam structure and a spring for pressing the hinge cam in a direction of the at least one cam structure, and the at least one hinge cam may be coupled to move in a direction parallel to the first rotation axis.

According to various embodiments, the at least one cam structure may include first curved portions protruded in a direction of the at least one hinge cam and first cam grooves formed between the first curved portions, and the at least one hinge cam may include second curved portions protruded in a direction of the at least one cam structure and second cam grooves formed between the second curved portions, and when the first arm is rotated, the at least one hinge cam may be moved along a first axial direction through an operation in which the first curved portions engage with the second curved portions.

According to various embodiments, when the electronic device is in the unfolded state, at least one curved portion of the first curved portions may be disposed at a position included in a support area of the first arm.

According to various embodiments, the support area may be formed in a plane in contact with the rear surface of the first plate.

According to various embodiments, when the electronic device is in the unfolded state, the at least one hinge cam may include a contact area in contact with the rear surface of the first plate.

According to various embodiments, the contact area may be formed in a flat shape.

According to various embodiments, the hinge device may include a plurality of hinge cams spaced apart from each other and include at least one shaft bracket disposed between the hinge cams.

According to various embodiments, the at least one shaft bracket may be coupled in a manner in which the first shaft can be inserted through the the at least one shaft bracket, and when the electronic device is in the unfolded state, the shaft bracket may include a contact area in contact with the rear surface of the first plate.

According to various embodiments, the contact area may be formed in a flat shape.

According to various embodiments, the electronic device further may include a hinge housing including a receiving part disposed between the first housing and the second housing, wherein the at least one hinge device may be fixed to the hinge housing in a manner in which the at least one shaft bracket is fixed to the receiving part.

According to various embodiments, the electronic device further may include a hinge housing including a receiving part disposed between the first housing and the second housing, and the at least one hinge device may be fixed to the receiving part.

According to various embodiments, the first rotation bracket and the second rotation bracket may be disposed to form substantially the same flat surface as that of the first housing and the second housing when the electronic device is in the unfolded state.

According to various embodiments, the first arm and the second arm may be rotatably coupled to the first rotation bracket and the second rotation bracket each other.

According to various embodiments, the first plate may be disposed to at least partially overlap at least a portion of the first rotation bracket, and the second plate may be disposed to at least partially overlap at least a portion of the second rotation bracket.

According to various embodiments, the first plate and the second plate may be disposed to form substantially the same flat surface as that of the first rotation bracket and second rotation bracket.

According to various embodiments, the electronic device may further include at least one support structure disposed in a manner in which the first shaft and/or the second shaft can be inserted through the at least one support structure, wherein when the electronic device is in the unfolded state, the support structure may include a flat contact area for contacting the rear surface of the first plate and/or the second plate.

According to various embodiments, the electronic device may further include a digitizer disposed under the flexible display and configured to detect an input of the electronic pen.

According to various embodiments, the hinge device (e.g., the hinge device 320 of FIG. 8) may include a rotation bracket link (e.g., the rotation bracket link 321 of FIG. 5), a first rotation bracket (e.g., the first rotation bracket 322 of FIG. 8) rotatably coupled to the rotation bracket link based on the folding axis, a second rotation bracket (e.g., the second rotation bracket 323 of FIG. 8) rotatably coupled to the rotation bracket link based on the folding axis at a position opposite to that of the first rotation bracket, a first arm (e.g., the first arm 324 of FIG. 8) rotatably disposed based on a first rotation axis (e.g., the first rotation axis X1 of FIG. 8) of a first shaft (e.g., the first shaft HS1 of FIG. 8) coupled to the first rotation bracket and disposed parallel to the folding axis at one side of the folding axis and including at least one first cam structure (e.g., the cam structures 3243 and 3244 of FIG. 5), a second arm (e.g., the second arm 325 of FIG. 8) coupled to the second rotation bracket and rotatably disposed based on a second rotation axis (e.g., the second rotation axis X2 of FIG. 8) of the second shaft (e.g., the second shaft HS2 of FIG. 8) disposed parallel to the folding axis at the other side of the folding axis and including at least one second cam structure (e.g., the cam structures 3253 and 3254 of FIG. 5), and at least one hinge cam (e.g., the hinge cams 327, 328, and 329 of FIG. 5) disposed to be cam-coupled to the at least one first cam structure and the at least one second cam structure in a manner in which the first shaft and the second shaft can be inserted through the at least one hinge cam, wherein the first arm, the second arm, and the at least one first cam structure, the at least one second cam structure, and the at least one hinge cam may include a flat support area for supporting at least one plate (e.g., the plates 341 and 342 of FIG. 5) disposed thereon.

The embodiments of the disclosure disclosed in this specification and drawings only present a specific example in order to easily describe the technical contents according to certain embodiments of the disclosure and to help an understanding of the embodiments of the disclosure, and they do not intend to limit the scope of the embodiments of the disclosure. Therefore, all changes or modifications derived based on the technical spirit of various embodiments of the disclosure in addition to the embodiments disclosed herein should be construed as being included in the scope of various embodiments of the disclosure.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device, comprising:
    a first housing;
    a second housing;
    at least one hinge device configured to foldably couple the first housing and the second housing with respect to a folding axis and including:
        a rotation bracket link;
        a first rotation bracket rotatably coupled to the rotation bracket link with respect to the folding axis and connected to the first housing;
        a second rotation bracket rotatably coupled to the rotation bracket link with respect to the folding axis and connected to the second housing;
        a first arm coupled to the first rotation bracket and rotatably disposed based on a first rotation axis of a first shaft disposed parallel to the folding axis at a first side of the folding axis, the first arm comprising a first body and at least one first cam structure extended from the first body;
        a second arm coupled to the second rotation bracket and rotatably disposed based on a second rotation axis of a second shaft disposed parallel to the folding axis at a second side of the folding axis, the second arm comprising a second body and at least one second cam structure extended from the second body; and
        at least one hinge cam disposed to be cam-coupled to the at least one first cam structure and the at least one second cam structure in a manner in which the first shaft and the second shaft are inserted through the at least one hinge cam;
    a flexible display disposed to receive support from the first housing, the second housing, and the hinge device;
    a first plate disposed to at least partially overlap the first arm and coupled to the first housing under the flexible display; and
    a second plate disposed to at least partially overlap the second arm and coupled to the second housing under the flexible display,
    wherein the first body, the at least one first cam structure, the second body, the at least one second cam structure and the at least one hinge cam each have a flat area for respectively contacting the first plate and the second plate when the electronic device is in an unfolded state.

2. The electronic device of claim 1, wherein the
    at least one first cam structure is disposed in a manner in which the first shaft is inserted through the at least one first cam structure, and
    wherein the at least one first cam structure is coupled to the first shaft to perform an idle rotation in relation to the first shaft.

3. The electronic device of claim 2, further comprising:
    at least one hinge cam disposed to face the at least one first cam structure; and
    a spring configured to press the hinge cam in a direction of the at least one first cam structure,
    wherein the at least one hinge cam is arranged to move in a direction parallel to the first rotation axis.

4. The electronic device of claim 3, wherein:
    the at least one first cam structure comprises:
        first curved portions protruded in a direction of the at least one hinge cam, and
        first cam grooves formed between the first curved portions,
    the at least one hinge cam comprises:
        second curved portions protruded in a direction of the at least one first cam structure, and
        second cam grooves formed between the second curved portions, and
    when the first arm is rotated, the at least one hinge cam is moved along a first axial direction through an operation in which the first curved portions engage with the second curved portions.

5. The electronic device of claim 4, wherein at least one curved portion of the first curved portions is disposed at a position included in the flat area of the first arm when the electronic device is in the unfolded state.

6. The electronic device of claim 5, wherein the flat area of the first arm is formed in a plane in contact with a rear surface of the first plate.

7. The electronic device of claim 3, wherein the at least one hinge cam comprises a contact area in contact with a rear surface of the first plate when the electronic device is in the unfolded state.

8. The electronic device of claim 7, wherein the contact area is formed in a plane.

9. The electronic device of claim 3, wherein the at least one hinge device comprises:
a plurality of hinge cams spaced apart, and
at least one shaft bracket disposed between the hinge cams.

10. The electronic device of claim 9, wherein:
the at least one shaft bracket is coupled in a manner in which the first shaft is inserted through the at least one shaft bracket, and
the shaft bracket comprises a contact area in contact with a rear surface of the first plate when the electronic device is in the unfolded state.

11. The electronic device of claim 10, wherein the contact area is formed in a plane.

12. The electronic device of claim 9, further comprising a hinge housing including a receiving part disposed between the first housing and the second housing,
wherein the at least one hinge device is fixed to the hinge housing in a manner in which the at least one shaft bracket is fixed to the receiving part.

13. The electronic device of claim 1, further comprising a hinge housing including a receiving part disposed between the first housing and the second housing,
wherein the at least one hinge device is fixed to the receiving part.

14. The electronic device of claim 1, wherein the first rotation bracket and the second rotation bracket are disposed to collectively form a substantially same flat surface as that of the first housing and the second housing when the electronic device is in the unfolded state.

15. The electronic device of claim 1, wherein the first arm and the second arm are rotatably coupled to the first rotation bracket and the second rotation bracket each other.

16. The electronic device of claim 1, wherein the first plate is disposed to at least partially overlap at least a portion of the first rotation bracket, and
the second plate is disposed to at least partially overlap at least a portion of the second rotation bracket.

17. The electronic device of claim 16, wherein the first plate and the second plate are disposed to collectively form a substantially same flat surface of the first rotation bracket and the second rotation bracket.

18. The electronic device of claim 1, further comprising at least one support structure disposed in a manner in which the first shaft or the second shaft is inserted through the support structure,
wherein the support structure comprises a flat contact area for contacting a rear surface of the first plate or the second plate when the electronic device is in the unfolded state.

19. The electronic device of claim 1, further comprising a digitizer disposed under the flexible display and configured to detect an input of an electronic pen.

20. A hinge device, comprising:
a rotation bracket link;
a first rotation bracket rotatably coupled to the rotation bracket link based on a folding axis;
a second rotation bracket rotatably coupled to the rotation bracket link based on the folding axis at a position opposite to that of the first rotation bracket;
a first arm coupled to the first rotation bracket and rotatably disposed based on a first rotation axis of a first shaft disposed parallel to the folding axis at a first side of the folding axis, the first arm comprising a first body and at least one first cam structure extended from the first body;
a second arm coupled to the second rotation bracket and rotatably disposed based on a second rotation axis of a second shaft disposed parallel to the folding axis at a second side of the folding axis, the second arm comprising a second body and at least one second cam structure extended from the second body; and
at least one hinge cam disposed to be cam-coupled to the at least one first cam structure and the at least one second cam structure in a manner in which the first shaft and the second shaft are inserted through the at least one hinge cam,
wherein the first body, the at least one first cam structure, the second body, the at least one second cam structure, and the at least one hinge cam comprise a flat area for contacting at least one plate disposed thereon.

* * * * *